(12) United States Patent
Hofmann et al.

(10) Patent No.: US 11,859,705 B2
(45) Date of Patent: Jan. 2, 2024

(54) ROUNDED STRAIN WAVE GEAR FLEXSPLINE UTILIZING BULK METALLIC GLASS-BASED MATERIALS AND METHODS OF MANUFACTURE THEREOF

(71) Applicant: California Institute of Technology, Pasadena, CA (US)

(72) Inventors: Douglas C. Hofmann, Altadena, CA (US); Robert P. Dillon, Costa Mesa, CA (US); Scott N. Roberts, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 877 days.

(21) Appl. No.: 16/802,267

(22) Filed: Feb. 26, 2020

(65) Prior Publication Data

US 2020/0278017 A1 Sep. 3, 2020

Related U.S. Application Data

(60) Provisional application No. 62/811,798, filed on Feb. 28, 2019.

(51) Int. Cl.
*F16H 49/00* (2006.01)

(52) U.S. Cl.
CPC ..... *F16H 49/001* (2013.01); *F16H 2049/003* (2013.01)

(58) Field of Classification Search
CPC ............ F16H 49/001; F16H 2049/003; F16H 2049/006; F16H 2049/008; F16H 55/0833; F16H 2035/003; B25J 9/1025
See application file for complete search history.

(56) References Cited

U.S. PATENT DOCUMENTS

| 2,931,249 A | 4/1960 | Walton |
|---|---|---|
| 3,119,283 A | 1/1964 | Itzhak |
| (Continued) | | |

FOREIGN PATENT DOCUMENTS

| CN | 101709773 A | 5/2010 |
|---|---|---|
| CN | 102563006 A | 7/2012 |
| (Continued) | | |

OTHER PUBLICATIONS

Topology Optimization Based Design of Lighweight and Low Vibration Gear Bodies Published 2018.*

(Continued)

*Primary Examiner* — Zakaria Elahmadi

(57) ABSTRACT

Harmonic drives are used widely in robotics as a method for achieving high gear reductions and for driving force transmissions. The harmonic drive is made a three components: a wave generator, a flexspline, and a circular spline. Embodiments described flexsplines for a metal strain wave gearing. The cup of the flexspline is free from sharp edges and with a rounded bottom with a curvature maximized based on the geometry of the flexspline. Compared to a steel flexspline, implementations of flexsplines will have the same outer diameter, the same number of teeth and profile, the same input shaft/base, the same wall thickness near the teeth, but comprise a rounded bottom where the input shaft/base transitions to the straight wall of the flexspline, providing improved performance of BMG flexsplines by reducing low cycle fatigue failures due to stress concentrations.

16 Claims, 19 Drawing Sheets

(56) References Cited

U.S. PATENT DOCUMENTS

| | | |
|---|---|---|
| 3,435,512 A | 4/1969 | Macrobbie |
| 3,529,457 A | 9/1970 | Bowers |
| 3,682,606 A | 8/1972 | Anderson et al. |
| 3,986,412 A | 10/1976 | Farley et al. |
| 4,123,737 A | 10/1978 | Hoagland, Jr. |
| RE29,989 E | 5/1979 | Polk et al. |
| 4,173,393 A | 11/1979 | Maurer |
| 4,202,404 A | 5/1980 | Carlson |
| 4,711,795 A | 12/1987 | Takeuchi et al. |
| 4,749,625 A | 6/1988 | Obayashi et al. |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 4,935,291 A | 6/1990 | Gunnink |
| 5,168,918 A | 12/1992 | Okuda et al. |
| 5,269,202 A * | 12/1993 | Kiyosawa ............ F16H 49/001 74/640 |
| 5,288,344 A | 2/1994 | Peker et al. |
| 5,310,432 A | 5/1994 | Yamanaka et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 5,985,204 A | 11/1999 | Otsuka et al. |
| 6,026,711 A * | 2/2000 | Tortora ................ F16H 49/001 384/512 |
| 6,162,130 A | 12/2000 | Masumoto et al. |
| 6,273,322 B1 | 8/2001 | Yamamoto et al. |
| 6,620,264 B2 | 9/2003 | Kundig et al. |
| 6,652,679 B1 | 11/2003 | Inoue et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,540,929 B2 | 6/2009 | Demetriou et al. |
| 7,552,664 B2 | 6/2009 | Bulatowicz |
| 7,575,040 B2 | 8/2009 | Johnson |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,596,106 B2 | 12/2013 | Tang et al. |
| 8,613,815 B2 | 12/2013 | Johnson et al. |
| 8,639,484 B2 | 1/2014 | Wei et al. |
| 8,789,629 B2 | 7/2014 | Parness et al. |
| 8,888,374 B1 * | 11/2014 | Nien .................... F16C 35/067 384/537 |
| 8,986,469 B2 | 3/2015 | Khalifa et al. |
| 9,057,120 B2 | 6/2015 | Pham et al. |
| 9,211,564 B2 | 12/2015 | Hofmann |
| 9,328,813 B2 | 5/2016 | Hofmann et al. |
| 9,610,650 B2 | 4/2017 | Hofmann et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 9,996,053 B2 | 6/2018 | O'keeffe et al. |
| 10,081,136 B2 | 9/2018 | Hofmann et al. |
| 10,151,377 B2 | 12/2018 | Hofmann et al. |
| 10,155,412 B2 | 12/2018 | Parness et al. |
| 10,174,780 B2 | 1/2019 | Hofmann et al. |
| 10,471,652 B2 | 11/2019 | Hofmann et al. |
| 10,487,934 B2 | 11/2019 | Kennett et al. |
| 10,690,227 B2 | 6/2020 | Hofmann et al. |
| 11,168,776 B2 | 11/2021 | Hofmann et al. |
| 11,198,181 B2 | 12/2021 | Hofmann et al. |
| 11,680,629 B2 | 6/2023 | Hofmann et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0052105 A1 | 3/2003 | Nagano et al. |
| 2003/0062811 A1 | 4/2003 | Peker et al. |
| 2004/0035502 A1 | 2/2004 | Kang et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0084407 A1 | 4/2005 | Myrick |
| 2005/0127139 A1 | 6/2005 | Slattery et al. |
| 2005/0263932 A1 | 12/2005 | Heugel |
| 2006/0105011 A1 | 5/2006 | Sun et al. |
| 2006/0130944 A1 | 6/2006 | Poon et al. |
| 2006/0156785 A1 | 7/2006 | Mankame et al. |
| 2007/0034304 A1 | 2/2007 | Inoue et al. |
| 2007/0226979 A1 | 10/2007 | Paton et al. |
| 2007/0228592 A1 | 10/2007 | Dunn et al. |
| 2007/0253856 A1 | 11/2007 | Vecchio et al. |
| 2008/0085368 A1 | 4/2008 | Gauthier et al. |
| 2008/0099175 A1 | 5/2008 | Chu et al. |
| 2008/0121316 A1 | 5/2008 | Duan et al. |
| 2008/0190521 A1 | 8/2008 | Loffler et al. |
| 2008/0304975 A1 | 12/2008 | Clark et al. |
| 2009/0011846 A1 | 1/2009 | Scott |
| 2009/0114317 A1 | 5/2009 | Collier et al. |
| 2009/0194205 A1 | 8/2009 | Loffler et al. |
| 2009/0263582 A1 | 10/2009 | Batchelder |
| 2009/0277540 A1 | 11/2009 | Langlet |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |
| 2011/0302783 A1 | 12/2011 | Nagata et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0132631 A1 | 5/2012 | Wescott et al. |
| 2012/0133080 A1 | 5/2012 | Moussa et al. |
| 2012/0289946 A1 | 11/2012 | Steger |
| 2013/0000788 A1 * | 1/2013 | Nagata ................... C22C 38/22 148/226 |
| 2013/0009338 A1 | 1/2013 | Mayer |
| 2013/0048152 A1 | 2/2013 | Na et al. |
| 2013/0062134 A1 | 3/2013 | Parness et al. |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0143060 A1 | 6/2013 | Jacobsen et al. |
| 2013/0277891 A1 | 10/2013 | Teulet |
| 2013/0280547 A1 | 10/2013 | Brandl et al. |
| 2013/0309121 A1 | 11/2013 | Prest et al. |
| 2013/0316867 A1 | 11/2013 | Kobayashi |
| 2013/0316868 A1 | 11/2013 | Kobayashi |
| 2013/0333814 A1 | 12/2013 | Fleury et al. |
| 2014/0004352 A1 | 1/2014 | McCrea et al. |
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0048969 A1 | 2/2014 | Swanson et al. |
| 2014/0070445 A1 | 3/2014 | Mayer |
| 2014/0083640 A1 | 3/2014 | Waniuk et al. |
| 2014/0090752 A1 | 4/2014 | Waniuk et al. |
| 2014/0093674 A1 | 4/2014 | Hofmann et al. |
| 2014/0141164 A1 | 5/2014 | Hofmann |
| 2014/0163717 A1 | 6/2014 | Das et al. |
| 2014/0202595 A1 | 7/2014 | Hofmann |
| 2014/0213384 A1 | 7/2014 | Johnson et al. |
| 2014/0217855 A1 * | 8/2014 | Shibamoto ............ F16H 49/001 310/339 |
| 2014/0224050 A1 | 8/2014 | Hofmann et al. |

(56) References Cited

U.S. PATENT DOCUMENTS

| | | |
|---|---|---|
| 2014/0227125 A1 | 8/2014 | Hofmann |
| 2014/0246809 A1 | 9/2014 | Hofmann et al. |
| 2014/0293384 A1 | 10/2014 | O'keeffe et al. |
| 2014/0312098 A1 | 10/2014 | Hofmann et al. |
| 2014/0334106 A1 | 11/2014 | Prest et al. |
| 2014/0334759 A1* | 11/2014 | Nien .............. F16H 49/001 |
| | | 384/513 |
| 2014/0342179 A1 | 11/2014 | Hofmann et al. |
| 2014/0348571 A1 | 11/2014 | Prest et al. |
| 2015/0014885 A1 | 1/2015 | Hofmann et al. |
| 2015/0047463 A1 | 2/2015 | Hofmann et al. |
| 2015/0068648 A1 | 3/2015 | Schroers et al. |
| 2015/0075744 A1 | 3/2015 | Hofmann et al. |
| 2015/0158067 A1 | 6/2015 | Kumar et al. |
| 2015/0165693 A1 | 6/2015 | Sagoo et al. |
| 2015/0209889 A1 | 7/2015 | Peters et al. |
| 2015/0219572 A1 | 8/2015 | Beuth, Jr. et al. |
| 2015/0289605 A1 | 10/2015 | Prest et al. |
| 2015/0298443 A1 | 10/2015 | Hundley et al. |
| 2015/0299825 A1 | 10/2015 | Poole et al. |
| 2015/0314566 A1 | 11/2015 | Mattlin et al. |
| 2015/0323053 A1 | 11/2015 | El-Wardany et al. |
| 2015/0352794 A1 | 12/2015 | Nguyen et al. |
| 2016/0175929 A1 | 6/2016 | Colin et al. |
| 2016/0178047 A1 | 6/2016 | Kennett et al. |
| 2016/0186850 A1 | 6/2016 | Hofmann et al. |
| 2016/0258522 A1 | 9/2016 | Hofmann et al. |
| 2016/0263937 A1 | 9/2016 | Parness et al. |
| 2016/0265576 A1 | 9/2016 | Hofmann et al. |
| 2016/0299183 A1 | 11/2016 | Lee |
| 2016/0361765 A1 | 12/2016 | Danger et al. |
| 2016/0361897 A1 | 12/2016 | Hofmann et al. |
| 2017/0121799 A1 | 5/2017 | Hofmann et al. |
| 2017/0137955 A1 | 5/2017 | Hofmann et al. |
| 2017/0211168 A1 | 7/2017 | Liu et al. |
| 2017/0226619 A1 | 8/2017 | Hofmann et al. |
| 2017/0227106 A1* | 8/2017 | Takizawa .............. F16H 49/001 |
| 2017/0276225 A1 | 9/2017 | Takehana et al. |
| 2017/0321790 A1 | 11/2017 | Klassen et al. |
| 2018/0119259 A1 | 5/2018 | Hofmann et al. |
| 2018/0257141 A1* | 9/2018 | Hofmann ................ B22F 10/64 |
| 2018/0339338 A1 | 11/2018 | Hofmann et al. |
| 2018/0339342 A1 | 11/2018 | Hofmann |
| 2018/0345366 A1 | 12/2018 | Hofmann |
| 2019/0022923 A1 | 1/2019 | Hofmann et al. |
| 2019/0126674 A1 | 5/2019 | Parness et al. |
| 2019/0154130 A1 | 5/2019 | Hofmann et al. |
| 2019/0170235 A1 | 6/2019 | Hofmann et al. |
| 2019/0177826 A1 | 6/2019 | Hofmann et al. |
| 2019/0195269 A1 | 6/2019 | Hofmann et al. |
| 2020/0278016 A1 | 9/2020 | Hofmann et al. |
| 2020/0318721 A1 | 10/2020 | Hofmann et al. |
| 2022/0055114 A1 | 2/2022 | Hofmann et al. |

FOREIGN PATENT DOCUMENTS

| | | |
|---|---|---|
| CN | 103153502 A | 6/2013 |
| CN | 203227820 U | 10/2013 |
| DE | 102005014972 A1 | 10/2006 |
| DE | 102010062089 A1 | 5/2012 |
| DE | 102014003441 A1 | 9/2015 |
| DE | 112018001284 T5 | 11/2019 |
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| EP | 3129677 B1 | 9/2021 |
| JP | 61276762 A | 12/1986 |
| JP | 09121094 A | 5/1997 |
| JP | 2002045960 A | 2/2002 |
| JP | 2004315340 A | 11/2004 |
| JP | 2004353053 A | 12/2004 |
| JP | 2007040517 A | 2/2007 |
| JP | 2007040518 A | 2/2007 |
| JP | 2007247037 A | 9/2007 |
| JP | 2008115932 A | 5/2008 |
| JP | 2008264865 A | 11/2008 |
| JP | 2011045931 A | 3/2011 |
| JP | 2012046826 A | 3/2012 |
| JP | 2012162805 A | 8/2012 |
| JP | 2013057397 A | 3/2013 |
| JP | 5249932 B2 | 7/2013 |
| JP | 2013238278 A | 11/2013 |
| JP | 2013544648 A | 12/2013 |
| KR | 101420176 B1 | 7/2014 |
| KR | 1020190119154 A | 10/2019 |
| WO | WO-2005111467 A1 * | 11/2005 ............. B62D 5/008 |
| WO | 2006073428 A2 | 7/2006 |
| WO | 2007038882 A1 | 4/2007 |
| WO | 2008058896 A1 | 5/2008 |
| WO | 2008156889 A2 | 12/2008 |
| WO | 2009069716 A1 | 6/2009 |
| WO | 2011159596 A1 | 12/2011 |
| WO | 2012031022 A2 | 3/2012 |
| WO | 2012083922 A1 | 6/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |
| WO | 2014058498 A3 | 4/2014 |
| WO | 2015042437 A1 | 3/2015 |
| WO | 2015156797 A1 | 10/2015 |
| WO | 2016116562 A1 | 7/2016 |
| WO | 2018165662 A1 | 9/2018 |
| WO | 2018218077 A1 | 11/2018 |
| WO | 2018218247 A1 | 11/2018 |
| WO | 2018223117 A2 | 12/2018 |
| WO | 2018223117 A3 | 1/2019 |

OTHER PUBLICATIONS

Extended European Search Report for European Application No. 14889035.3, Search completed Dec. 4, 2017, dated Dec. 13, 2017, 10 pgs.

International Preliminary Report on Patentability for International Application PCT/US2018/035813, Report dated Dec. 3, 2019, dated Dec. 12, 2019, 9 pgs.

International Preliminary Report on Patentability for International Application PCT/US2013/047950, dated Dec. 31, 2014, dated Jan. 8, 2015, 7 pgs.

International Preliminary Report on Patentability for International Application PCT/US2013/050614, dated Jan. 20, 2015, dated Jan. 29, 2015, 9 pgs.

International Preliminary Report on Patentability for International Application PCT/US2014/033510, dated Oct. 12, 2016, dated Oct. 20, 2016, 9 pgs.

International Preliminary Report on Patentability for International Application PCT/US2014/056615, dated Mar. 22, 2016, dated Mar. 31, 2016, 11 pgs.

International Preliminary Report on Patentability for International Application PCT/US2018/022020, Report dated Sep. 10, 2019, dated Sep. 19, 2019, 10 pgs.

International Preliminary Report on Patentability for International Application PCT/US2018/034481, Report dated Nov. 26, 2019, dated Dec. 5, 2019, 17 pgs.

International Preliminary Report on Patentability for International Application PCT/US2018/034924, Report dated Nov. 26, 2019, dated Dec. 5, 2019, 13 pgs.

International Search Report and Written Opinion for International Application No. PCT/US2013/050614, Completed May 7, 2014, dated May 7, 2014, 12 pgs.

International Search Report and Written Opinion for International Application No. PCT/US2018/022020, Search completed Jul. 2, 2018, dated Jul. 3, 2018, 12 pgs.

(56) References Cited

OTHER PUBLICATIONS

International Search Report and Written Opinion for International Application No. PCT/US2018/034481, Search completed Sep. 10, 2018, dated Sep. 10, 2018, 19 pgs.
International Search Report and Written Opinion for International Application No. PCT/US2018/034924, Search completed Sep. 18, 2018, dated Sep. 19, 2018, 15 pgs.
International Search Report and Written Opinion for International Application No. PCT/US2018/035813, Search completed Dec. 12, 2018, dated Dec. 12, 2018, 11 pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 pgs.
International Search Report and Written Opinion for International Application PCT/US2014/056615, completed Dec. 29, 2014, dated Dec. 30, 2014, 13 pgs.
"Corrosion of Titanium and Titanium Alloys", Total Materia., printed Feb. 16, 2016 from http://www.totalmateria.com/Article24.htm, published Sep. 2001, 4 pgs.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology, 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4, DOI: 10.1103/PhysRevLett.15.125503.
Abrosimova et al., "Crystalline layer on the surface of Zr-based bulk metallic glasses", Journal of Non-Crystalline solids, Mar. 6, 2001, vol. 288, pp. 121-126.
An et al., "Synthesis of Single-Component Metallic Glasses by Thermal Spray of Nanodroplets on Amorphous Substrates", Applied Physics Letters, Jan. 26, 2012, vol. 100, pp. 041909-1-041909-4, doi:10.1063/1.3675909.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326, doi:10.1016/j.scriptamat.2005.09.051.
Bakkal, "Sliding tribological characteristics of Zr-based bulk metallic glass under lubricated conditions", Intermetallics, Mar. 19, 2010, vol. 18, pp. 1251-1253, doi:10.1016/j.intermet.2010.02.003.
Bardt et al., "Micromolding three-dimensional amorphous metal structures", J. Mater. Res, Feb. 2007, vol. 22, No. 2, pp. 339-343, DOI: 10.1557/JMR.2007.0035.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631, doi:10.1016/j.surfcoat.2007.09.028.
Berger, "A Survey of Additive Manufacturing Processes Applied on the Fabrication of Gears", 1st International Conference on Progress in Additive Manufacturing (Pro—AM 2014), May 26-28, 2014, pp. 315-320, doi: 10.3850/978-981-09-0446-3_010.
Boopathy et al., "Near-threshold fatigue crack growth in bulk metallic glass composites", J. Mater. Res., vol. 24, No. 12, pp. 3611-3619, Dec. 2009, DOI: 10.1557/fmr.2009.0439., Dec. 2009.
Bordeenithikasem et al., "Glass forming ability, flexural strength, and wear properties of additively manufactured Zr-based bulk metallic glasses produced through laser powder bed fusion", Additive Manufacturing, Mar. 21, 2018, vol. 21, pp. 312-317, https://doi.org/10.1016/j.addma.2018.03.023.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs.
Byrne et al., "Bulk Metallic Glasses", Science, Jul. 25, 2008, vol. 321, pp. 502-503, doi:10.1126/science.1158864.
Cadney et al., "Cold Gas Dynamic Spraying as A Method for Freeforming and Joining Materials", Science Direct, Surface & Coatings Technology, Mar. 15, 2008, vol. 202, pp. 2801-2806, available online Oct. 17, 2007, doi: 10.1016/j.surfcoat.2007.10.010.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures Via Molding of Metallic Glass", Proceeding of the Annual Meeting of the ASPE, Monterey, CA, 2006, pp. 283-286.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652, DOI: 10.1157/jmr.2011.278.
Cheng et al., "Characterization of Mechanical Properties of Fecrbsimnnby Metallic Glass Coatings", J Mater Sci., Apr. 16, 2009, vol. 44, pp. 3356-3363, DOI: 10.1007/s10853-009-3436-5.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430, doi:10.1016/j.intermet.2010.08.040.
Choi et al., "Tribological behavior of the kinetic sprayed $Ni_{59}Ti_{16}Zr_{20}Si_2Sn_3$ bulk metallic glass", Journal of Alloys and Compounds, May 31, 2007, vol. 434-435, pp. 64-67, doi:10.1016/j.jallcom.2006.08.283.
Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286, doi:10.1016/j.actamat.201.08.006.
Parlar et al., "Sliding Tribological Characteristics of Zr-Based Bulk Metallic Glass", Intermetallics, Jan. 2008, vol. 16, pp. 34-41, doi:10.1016/j.intermet.2007.07.001.
Pauly et al., "Modeling Deformation Behavior of Cu—Zr—Al Bulk Metallic Glass Matrix Composites", Applied Physics Letters, Sep. 2009, vol. 95, pp. 101906-1-101906-3, doi:10.1063/1.3222973.
Pauly et al., "Processing Metallic Glasses by Selective Laser Melting", Materials Today, Jan./Feb. 2013, vol. 16, pp. 37-41 http://dx.org/10.1016/j.mattod.2013.01.018.
Pauly et al., "Transformation-mediated ductility in CuZr-based bulk metallic glasses", Nature Materials, May 16, 2010, vol. 9, Issue 6, pp. 473-477, DOI:10.1038/NMAT2767.
Ponnambalam et al., "Fe-Based Bulk Metallic Glasses With Diameter Thickness Larger Than One Centimeter", J Mater Res, Feb. 17, 2004. vol. 19; pp. 1320-1323, DOI: 10.1557/JMR.2004.0176.
Porter et al., "Incorporation of Amorphous Metals into MEMS for High Performance and Reliability", Rockwell Scientific Company, Final Report, Nov. 1, 2003, 41 pgs.
Prakash et al., "Sliding Wear Behavior of Some Fe-, Co-and Ni-Based Metallic Glasses During Rubbing Against Bearing Steel", Tribology Letters, May 1, 2000, vol. 8, pp. 153-160.
Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756, doi:10.1016/j.msea.2010.08.055.
Ramamurty et al., "Hardness and Plastic Deformation in A Bulk Metallic Glass", Acta Materialia, Feb. 2005, vol. 53, pp. 705-717, doi:10.1016/j.actamat.20004.10.023.
Revesz et al., "Microstructure and Morphology of Cu—Zr—Ti Coatings Produced by Thermal Spray and Treated by Surface Mechanical Attrition", Science Direct, Journal of Alloys and Compounds, Jul. 14, 2011, vol. 509S, pp. S482-S485, doi:10.1016/j.jallcom.2010.10.170.

(56) References Cited

OTHER PUBLICATIONS

Rigney et al., "The Evolution of Tribomaterial During Sliding: A Brief Introduction", Tribol. Lett, Jul. 1, 2010, vol. 39, pp. 3-7, DOI: 10.1007/s11249-009-9498-3.
Roberts, "Developing and Characterizing Bulk Metallic Glasses for Extreme Applications", XP055731434, Retrieved from the Internet (Dec. 16, 2013): URL:https://thesis.library.caltech.edu/8049/141/Scott_Roberts_thesis_2013_Complete_ Thesis. pdf [retrieved on Sep. 17, 2020].
Roberts et al., "Cryogenic Charpy Impact Testing of Metallic Glass Matrix Composites", Scripta Materialia, Nov. 11, 2011, 4 pgs., doi:10.1016/j.scriptamat.2011.01.011.
Sanders et al., "Stability of Al-rich glasses in the Al—La—Ni system", Intermetallics, 2006, vol. 14, pp. 348-351, doi:10.1016/j.intermet.2005.06.009.
Schuh et al., "A Survey of Instrumented Indentation Studies on Metallic Glasses", J. Mater. Res., Jan. 2004, vol. 19, No. 1, pp. 46-57.
Segu et al., "Dry Sliding Tribological Properties of Fe-Based Bulk Metallic Glass", Tribol. Lett., Apr. 28, 2012, vol. 47, pp. 131-138, DOI: 10.1007/s11249-012-9969-9.
Shen et al., "3D printing of large, complex metallic glass structures", Materials and Design, Mar. 2017, vol. 117, pp. 213-222, http://dx.doi.org/10.1016/j.matdes.2016.12.087.
Shen et al., "Exceptionally High Glass-Forming Ability of An Fecocrmocby Alloy", Applied Physics, Apr. 5, 2005, vol. 86, pp. 151907-1-151907-3, DOI: 10.1063/1.1897426.
Singer et al., "Wear behavior of triode-sputtered MoS2 coatings in dry sliding contact with steel and ceramics", Wear, Jul. 1996, vol. 195, Issues 1-2, pp. 7-20.
Sinmazcelik et al., "A review: Fibre metal laminates, background, bonding types and applied test methods", Materials and Design, vol. 32, Issue 7, 3671, Mar. 4, 2011, pp. 3671-3685, doi: 10.1016/j.matdes.2011.03.011.
Song et al., "Strategy for pinpointing the formation of B2 CuZr in metastable CuZr-based shape memory alloys", Acta Materialia, Aug. 6, 2011, vol. 59, pp. 6620-6630, doi:10.1016/j.actamat.2011.07.017.
Sun et al., "Fiber metallic glass laminates", J. Mater. Res., Dec. 2010, vol. 25, No. 12, pp. 2287-2291, DOI: 10.1557/JMR.2010.0291.
Sundaram et al., "Mesoscale Folding, Instability, and Disruption of Laminar Flow in Metal Surfaces", Physical Review Letters, Sep. 7, 2012, vol. 109, pp. 106001-1-106001-5, DOI: 10.1103/PhysRevLett.109.106001.
Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.
Tam et al., "Abrasion Resistance of Cu Based Bulk Metallic Glasses", Journal of Non-Crystalline Solids, Oct. 18, 2004, vol. 347, pp. 268-272, doi:10.1016/j.noncrysol.2004.09.008.
Tam et al., "Abrasive Wear of $Cu_{60}Zr_{30}Ti_{10}$ Bulk Metallic Glass", Materials Science and Engineering, Apr. 1, 2004, vol. A384 pp. 138-142, doi:10.1016/j.msea.2004.05.73.
Tan et al., "Synthesis of La-based in-situ bulk metallic glass matrix composite", Intermetallics, Nov. 2002, vol. 10, Issues 11-12, pp. 1203-1205.
Tao et al., "Effect of Rotational Sliding Velocity on Surface Friction And Wear Behavior in Zr-Based Bulk Metallic Glass", Journal of Alloys and Compounds, Mar. 4, 2010, vol. 492, pp. L36-L39, doi: 10.1016/j.jallcom.2009.11.113.
Tao et al., "Influence of Isothermal Annealing on The Micro-Hardness And Friction Property in Cuzral Bulk Metallic Glass", Advanced Materials Research, Jan. 1, 2011, vols. 146-147, pp. 615-618, doi: 10.4028/www.scientific.net/AMR.146-147.615.
Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.

Wagner, "Mechanical Behavior of 18 Ni 200 Grade Maraging Steel at Cyrogenic Temperatures", J Aircraft, Nov. 1, 1986, vol. 23, No. 10, pp. 744-749.
Wang et al., "Progress in Studying The Fatigue Behavior of Zr-Based Bulk-Metallic Glasses And Their Composites", Intermetallics, Mar. 6, 2009, vol. 17, pp. 579-590, doi:10.1016/j.intermet.2009.01.017.
Whang et al., "Microstructures and age hardening of rapidly quenched Ti—Zr—Si alloys", Journal of Materials Science Letters, 1985, vol. 4, pp. 883-887.
Wu et al., "Bulk Metallic Glass Composites with Transformation-Mediated Work-Hardening and Ductility", Adv. Mater., Apr. 26, 2010, vol. 22, pp. 2770-2773, DOI: 10.1002/adma.201000482.
Wu et al., "Dry Sliding tribological behavior of Zr-based bulk metallic glass", Transactions of Nonferrous Metals Society of China, Jan. 16, 2012, vol. 22, Issue 3, pp. 585-589, DOI: 10.1016/S10003-6326(11)61217-X.
Wu et al., "Effects of Environment on The Sliding Tribological Behaviors of Zr-Based Bulk Metallic Glass", Intermetallics, Jan. 27, 2012, vol. 25, 115-125, doi:10.1016/j.intermet.2011.12.025.
Wu et al., "Formation of Cu—Zr—Al bulk metallic glass composites with improved tensile properties", Acta Materialia 59, Feb. 19, 2011, pp. 2928-2936, doi:10.1016/j.actamat.2011.01.029.
Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.
Yin et al., "Microstructure and Mechanical Properties of A Spray-Formed Ti-Based Metallic Glass Former Alloy", Journal of Alloys and Compounds, Jan. 25, 2012, vol. 512, pp. 241-245, doi:10.1016/j.jallcom.2011-09.074.
Yokoyama et al., "Tough Hypoeutectic Zr-Based Bulk Metallic Glasses", Metallurgical and Materials Transactions, Year 2011, vol. 42A, pp. 1468-1475, DOI: 10.1007/s11661-011-0631-1.
Zachrisson et al., "Effect of Processing on Charpy Impact Toughness of Metallic Glass Matrix Composites", Journal of Materials Research, May 28, 2011, vol. 26, No. 10, pp. 1260-1268, DOI: 10.1557/jmr.2011.92.
Zhang et al., "Abrasive and Corrosive Behaviors of Cu—Zr—Al—Ag—Nb Bulk Metallic Glasses", Journal of Physics: Conference Series, 2009, vol. 144, pp. 1-4, doi:10.1088/1742-6596/1441/1/012034.
Zhang et al., "Robust Hydrophobic Fe-Based Amorphous Coating by Thermal Spraying", Applied Physics Letters, Sep. 20, 2012, vol. 101, pp. 121603-1-121603-4.
Zhang et al., "Wear Behavior of A Series of Zr-Based Bulk Metallic Glasses", Materials Science and Engineering, Feb. 25, 2008, vol. A475, pp. 124-127, doi: 10.1016/j.msea.2007.05.039.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. 1-2, pp. 344-350, DOI: 10.1007/s11666-010-9570-4.
Zhu et al., "Ta-particulate reinforced Zr-based bulk metallic glass matrix composite with tensile plasticity", Scripta Materialia, Mar. 2010, vol. 62, Issue 5, pp. 278-281, doi:10.1016/j.scriptamat.2009.11.018.
Zhuo et al., "Spray Formed Al-Based Amorphous Matrix Nanocomposite Plate", Journal of Alloys and Compounds, Mar. 1, 2011, vol. 509, pp. L169-L173, doi:10.1016/j.jallcom.2011.02.125.
Conner et al., "Shear band spacing under bending of Zr-based metallic glass plates", Acta Materialia, Jan. 27, 2004, vol. 52, pp. 2429-2434, doi:10.1016/j.actamat.2004.01.034.
Conner et al., "Shear bands and cracking of metallic glass plates in bending", Journal of Applied Physics, Jul. 15, 2003, vol. 94, No. 2, pp. 904-911, DOI: 10.1063/1.1582555.
Dai et al., "A new centimeter-diameter Cu-based bulk metallic glass", Scripta Materialia, Jan. 20, 2006, vol. 54, pp. 1403-1408, doi:10.1016/j.scriptamat.2005.11.077.
Dai et al., "High-performance bulk Ti—Cu—Ni—Sn—Ta nanocomposites based on a dendrite-eutectic microstructure", Journal of Materials Research, Sep. 2004, vol. 19, No. 9, pp. 2557-2566, DOI: 10.1557/JMR.2004.0332.

(56) References Cited

OTHER PUBLICATIONS

Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs., DOI: 10.1103/Physics.5.100.
Demetriou et al., "Glassy steel optimized for glass-forming ability and toughness", Applied Physics Letters, Jul. 31, 2009, vol. 95; pp. 041907-1-041907-3; http:/idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468, doi: 10.1016/h,scriptamat.2007.10.040.
Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, vol. 528, pp. 74-78, doi:10.1016/j.jallcom.2012.02.104.
Fan et al., "Metallic glass matrix composite with precipitated ductile reinforcement", Applied Physics Letters, Aug. 5, 2002, vol. 81, Issue 6, pp. 1020-1022, DOI: 10.1063/1.1498864.
Fleury et al., "Tribological properties of bulk metallic glasses", Materials Science and Engineering, Jul. 2004, vol. A375-377, pp. 276-279, doi:10.1016/j.msea.2003.10.065.
Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, May 27, 2011, vol. 4, pp. 1709-1717, doi:10.1016/j.jmbbm.2011.05.028.
Fu et al., "Sliding behavior of metallic glass Part I. Experimental investigations", Wear, Oct. 2001, vol. 250, pp. 409-419.
Ganesan et al., "Bonding Behavior Studies of Cold Sprayed Copper Coating on The PVC Polymer Substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, pp. 241913-1-241913-3, http://dx.doi.org/10.1063/1.47699997.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112, DOI: 10.1179/095066001225001067.
Gu et al., "Selective Laser Melting Additive Manufacturing of Ti-Based Nanocomposites: The Role of Nanopowder", Metallurgical and Materials Transactions A, Jan. 2014, vol. 45, pp. 464-476, DOI: 10.1007/s11661-013-1968-4.
Guo et al., "Tensile ductility and necking of metallic glass", Nature Materials, Oct. 2007, vol. 6, pp. 735-739, published online Aug. 19, 2007, doi:10.1038/nmat1984.
Ha et al., "Tensile deformation behavior of two Ti-based amorphous matrix composites containing ductile β dendrites", Materials Science and Engineering: A, May 28, 2012, vol. 552, pp. 404-409, http://dx.doi.org/10.1016/j.msea.2012.05.061.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, 135502-1-135502-4, DOI: 10.1103/PhysRevLett.99.135502.
Haruyama et al., "Volume and enthalpy relaxation in Zr55Cu30Ni5Al10 bulk metallic glass", Acta Materialia, Mar. 2010, vol. 59, pp. 1829-1836, doi:10.1016/jactamat.2009.11.025.

Hays et al., "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.
He et al., "Novel Ti-base nanostructure-dendrite composite with enhanced plasticity", Nature Materials, Jan. 2003, Published Dec. 8, 2002, vol. 2, pp. 33-37, doi: 10.1038/nmat792.
Hejwowski et al., "A Comparative Study of Electrochemical Properties of Metallic Glasses and Weld Overlay Coatings", Vacuum, Feb. 2013, vol. 88, pp. 118-123, doi:10.1016/j.vacuum.2012.02.031.
Hofmann, "Bulk Metallic Glasses and Their Composites: A Brief History of Diverging Fields", Journal of Materials, Jan. 2013, vol. 2013, 7 pgs., http://dx.doi.org/10.1155/2013/517904.
Hofmann, "Shape Memory Bulk Metallic Glass Composites", Science, Sep. 10, 2010, vol. 329, pp. 1294-1295, doi:10.1126/science.1193522.
Hofmann et al., "Designing metallic glass matrix composites with high toughness and tensile ductility", Nature Letters, Feb. 28, 2008, vol. 451, pp. 1085-1090, doi:10.1038/nature06598.
Hofmann et al., "Development of tough, low-density titanium-based bulk metallic glass matrix composites with tensile ductility", PNAS, Dec. 23, 2008, vol. 105, pp. 20136-20140, www.phas.orgdgidoi/10.1073/pnas.0809000106.
Hofmann et al., Improving Ductility in Nanostructured Materials and Metallic Glasses: "Three Laws", Material Science Forum, 2010, vols. 633-634, pp. 657-663, published online Nov. 19, 2009, doi: 10.4028/www.scientific.net/MSF.633-634.657.
Hofmann et al., "Semi-solid Induction Forging of Metallic Glass Matrix Composites", JOM, Dec. 2009, vol. 61, No. 12, pp. 11-17, plus cover.
Hong et al., "Microstructural Characteristics of High-Velocity Oxygen-Fuel (HVOF) Sprayed Nickel-Based Alloy Coating", Journal of Alloys and Compounds, Jul. 26, 2013, vol. 581, pp. 398-403, http://dx.doi.org/10.1016/j.jallcom.2013.07.109.
Hu et al., "Crystallization Kinetics of the $CU_{47.5}Zr_{74.5}Al_5$ Bulk Metallic Glass under Continuous and Iso-thermal heating", Applied Mechanics and Materials, Sep. 8, 2011, vols. 99-100, pp. 1052-1058, doi: 10.4028/www.scientific.net/AMM.99-100.1052.
Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97, doi:10.1016/j.scriptamat.2005.03.005.
Huang et al., "Fretting wear behavior of bulk amorphous steel", Intermetallics, Jun. 12, 2011, vol. 19, pp. 1385-1389, doi:10.1016/j.intermet.2011.04.014.
Inoue et al., "Cobalt-based bulk glassy alloy with ultrahigh strength and soft magnetic properties", Nature Materials, Oct. 21, 2003, vol. 2, pp. 661-663, doi:10.1038/nmat982.
Inoue et al., "Development and applications of late transition metal bulk metallic glasses", Bulk Metallic Glasses, pp. 1-25, 2008.
Inoue et al., "Developments and applications of bulk metallic glasses", Reviews on Advanced Materials Science, Feb. 28, 2008, vol. 18, pp. 1-9.
Inoue et al., "Preparation of 16 mm Diameter Rod of Amorphous $Zr_{65}Al_{7.5}Ni_{10}Cu_{17.5}$ Alloy", Material Transactions, JIM, 1993, vol. 34, No. 12, pp. 1234-1237.
Inoue et al., "Recent development and application products of bulk glassy alloys", Acta Materialia, Jan. 20, 2011, vol. 59, Issue 6, pp. 2243-2267, doi.10.1016/j.actamat.2010.11.027.
Ishida et al., "Wear Resistivity of Super-Precision Microgear Made of Ni-Based Metallic Glass", Materials Science and Engineering, Mar. 25, 2007, vol. A449-451, pp. 149-154, doi:10.1016/j.msea.2006.02.300.
Jiang et al., "Low-Density High-Strength Bulk Metallic Glasses and Their Composites: A Review", Advanced Engineering Materials, Nov. 19, 2014, pp. 1-20, DOI: 10.1002/adem.201400252.
Jiang et al., "Tribological Studies of a Zr-Based Glass-Forming Alloy with Different States", Advanced Engineering Materials, Sep. 14, 2009, vol. 1, No. 11, pp. 925-931, DOI: 10.1002/adem.200900184.
Johnson et al., "Quantifying the Origin of Metallic Glass Formation", Nature Communications, Jan. 20, 2016, vol. 7, 10313, 7 pgs., doi: 10.1038/ncomms10313.

(56) References Cited

OTHER PUBLICATIONS

Jung et al., "Fabrication of Fe-based bulk metallic glass by selective laser melting: A parameter study", Materials and Design, Jul. 30, 2015, vol. 86, pp. 703-708, http://dx.doi.org/10.1016/j.matdes.2015.07.145.

Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.

Kim et al., "Amorphous Phase Formation of Zr-Based Alloy Coating by HVOF Spraying Process", Journal of Materials Science, Jan. 1, 2001, vol. 36, pp. 49-54.

Kim et al., "Design and synthesis of Cu-based metallic glass alloys with high glass forming ability", Journal of Metastable and Nanocrystalline Materials, Sep. 1, 2005, vols. 24-25, pp. 93-96, doi: 10.4028/www.scientific.net/JMNM.24-25.93.

Kim et al., "Enhancement of Metallic Glass Properties of Cu-Based BMG Coating by Shroud Plasma Spraying", Science Direct, Surface & Coatings Technology, Jan. 25, 2011, vol. 205, pp. 3020-3026, doi:10.1016/j.surfcoat.2010.11.012.

Kim et al., "Oxidation and Crystallization Mechanisms in Plasma-Sprayed Cu-Based Bulk Metallic Glass Coatings", Acta Materialia., Feb. 1, 2010, vol. 58, pp. 952-962, doi:10.1016/j.actamat.2009.10.011.

Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.

Kim et al., "Weldability of $Cu_{54}Zr_{22}Ti_{18}Ni_6$ bulk metallic glass by ultrasonic welding processing", Materials Letters, May 17, 2014, vol. 130, pp. 160-163, http://dx.doi.org/10.1016/j.matlet.2014.05.056.

Kim et al., "Weldability of CU54Zr22 Ti18Nis bulk metallic glass by ultrasonic welding processing", Materials Letters, May 17, 2014, vol. 130, pp. 160-163, http://dx.doi.org/10.1016/j.matlet.2014.05.056.

Kobayashi et al., "Fe-Based Metallic Glass Coatings Produced by Smart Plasma Spraying Process", Materials Science and Engineering, 2007, vol. B148, pp. 110-113, doi:10.1016/j.mseb.2007.09.035.

Kobayashi et al., "Mechanical Property of Fe-Base Metallic Glass Coating Formed by Gas Tunnel Type Plasma Spraying", ScienceDirect, Surface & Coatings Technology, (2007), 6 pgs., doi:10.1016/j.surfcoat.2007.09.011.

Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.

Kong et al., "Effect of Flash Temperature on Tribological Properties of Bulk Metallic Glasses", Tribol. Lett., Apr. 25, 2009, vol. 35, pp. 151-158, DOI 10.1007/s11249-009-9444-4.

Kozachkov et al., "Effect of cooling rate on the volume fraction of B2 phases in a CuZrAlCo metallic glass matrix composite", Intermetallics, Apr. 19, 2013, vol. 39, pp. 89-93, http://dx.org/10.1016/jintermet.2013.03.017.

Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326, doi:10.1016/j.msen.2003.10.086.

Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.

Kumar et al., "Bulk Metallic Glass: The Smaller the Better", Advanced Materials, Jan. 25, 2011, vol. 23, pp. 461-476, doi: 10.1002/adma.201002148.

Kumar et al., "Embrittlement of Zr-based Bulk Metallic Glasses", Science Direct, Acta Materialia, 2009, vol. 57, pp. 3572-3583, available online May 11, 2009, doi:10.1016/j.actamat.2009.04.16.

Kwon et al., "Wear Behavior of Fe-Based Bulk Metallic Glass Composites", Journal of Alloys and Compounds, Jul. 14, 2011, vol. 509S, pp. S105-S108, doi:10.1016/j.jallcom.2012.12.108.

Launey et al., "Fracture toughness and crack-resistance curve behavior in metallic glass-matrix composites", Applied Physics Letters, Jun. 18, 2009, vol. 94, pp. 241910-1-241910-3, DOI: 10.1063/1.3156026.

Launey et al., "Solution to The Problem of The Poor Cyclic Fatigue Resistance of Bulk Metallic Glasses", PNAS Early Edition, pp. 1-6, Jan. 22, 2009, www.pnas.org/cgi/doi/10.1073/pnas.0900740106., Jan. 22, 2009.

Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131, doi:10.1016/j.actamat.2004.05.025.

Lee et al., "Nanomechanical properties of embedded dendrite phase and its influence on inelastic deformation of $Zr_{55}Al_{10}Ni_5Cu_{30}$ glassy alloy", Materials Science and Engineering A, Mar. 25, 2007, vol. 375, pp. 945-948, doi:10.1016/j.msea.2006.02.014.

Li et al., "Selective laser melting of Zr-based bulk metallic glasses: Processing, microstructure and mechanical properties", Materials and Design, Sep. 21, 2016, vol. 112, pp. 217-226, http://dx.doi.org/10.1016/j.matdes.2016.09.071.

Li et al., "Wear Behavior of Bulk $Zr_{41}Ti_{14}Cu_{12.5}Ni_{10}Be_{22.5}$ Metallic Glasses", J. Mater. Res., Aug. 2002, vol. 17, No. 8, pp. 1877-1880.

Lillo et al., "Microstructure, Processing, Performance Relationships for High Temperature Coatings", U.S. Department of Energy, Office of Fossil Energy, under DOE Idaho Operations Office, Contract DE-AC07-05ID14517; Jul. 1, 2008, 22nd Annual Conference on Fossil Energy Materials, Pittsburgh, U.S., 8 pgs.

Lin et al., "Designing a toxic-element-free Ti-based amorphous alloy with remarkable supercooled liquid region for biomedical application", Intermetallics, Jul. 9, 2014, vol. 55, pp. 22-27, http://dx.doi.org/10.1016/j.intermet.2014.07.003.

List et al., "Impact Conditions for Cold Spraying of Hard Metallic Glasses", Journal of Thermal Spray Technology, Jun. 1, 2012, vol. 21, No. 3-4, pp. 531-540, DOI: 10.1007/s11666-012-9750-5.

Liu et al., "Influence of Heat Treatment on Microstructure and Sliding Wear of Thermally Sprayed Fe-Based Metallic Glass Coatings", Tribol. Lett., Mar. 4, 2012, vol. 46, pp. 131-138, DOI: 10.1007/s11249-012-9929-4.

Liu et al., "Metallic Glass Coating on Metals Plate by Adjusted Explosive Welding Technique", Applied Surface Science, Jul. 16, 2009, vol. 255, pp. 9343-9347, doi:10.1016/j.apsusc.2009.07.033.

Liu et al., "Microstructure and Properties of Fe-Based Amorphous Metallic Coating Produced by High Velocity Axial Plasma Spraying", Science Direct, Journal of Alloys and Compounds, Apr. 23, 2009, vol. 484, pp. 300-307, doi:10.1016/j.jallcom.2009.04.086.

Liu et al., "Sliding Tribological Characteristics of a Zr-based Bulk Metallic Glass Near The Glass Transition Temperature", Tribol. Lett., Jan. 29, 2009, vol. 33, pp. 205-210.

Liu et al., "Wear Behavior of A Zr-Based Bulk Metallic Glass and Its Composites", Journal of Alloys and Compounds, May 5, 2010, vol. 503, pp. 138-144, doi:10.1016/j.jallcom.2010.04.2170.

Lu et al., "Crystallization Prediction on Laser Three-Dimensional Printing of Zr-based Bulk Metallic Glass", Journal of Non-Crystalline Solids, 2017, vol. 461, pp. 12-17, available online Jan. 29, 2017, http://dx.doi.org/10.1016/j.jnoncrysol.2017.01.038.

Lupoi et al., "Deposition of Metallic Coatings on Polymer Surfaces Using Cold Spray", Science Direct, Surface & Coatings Technology, Sep. 6, 2010, vol. 205, pp. 2167-2173, doi:10.1016/j.surfcoat.2010.08.128.

Ma et al., "Wear Resistance of Zr-Based Bulk Metallic Glass Applied in Bearing Rollers", Materials Science and Engineering, May 4, 2004, vol. A386, pp. 326-330.

Maddala et al., "Effect of Notch Toughness and Hardness on Sliding Wear of $Cu_{50}hf_{41.5}a_{18.5}$ Bulk Metallic Glass", Scripta Materialia, Jul. 6, 2011, vol. 65, pp. 630-633, doi:10.1016/j.scriptamat.2011.06.046.

Madge, "Toughness of Bulk Metallic Glasses", Metals, Jul. 17, 2015, vol. 5, Issue 3, pp. 1279-1305, ISSN 2075-4701, doi:10.3390/met5031279.

Mahbooba et al., "Additive manufacturing of an iron-based bulk metallic glass larger than the critical casting thickness", Applied Materials Today, Feb. 27, 2018, vol. 11, pp. 264-269, https://doi.org/10.1016/j.apmt.2018.02.011.

(56) References Cited

OTHER PUBLICATIONS

Narayan et al., "On the hardness and elastic modulus of bulk metallic glass matrix composites", Scripta Materialia, Jun. 9, 2010, vol. 63, Issue 7, pp. 768-771, doi:10.1016/j.scriptamat.2010.06.010.
Ni et al., "High Performance Amorphous Steel Coating Prepared by HVOF Thermal Spraying", Journal of Alloys and Compounds, 2009, vol. 467, pp. 163-167, doi:10.1016/j.jallcom.2007.11.133.
Nishiyama et al., "Recent progress of bulk metallic glasses for strain-sensing devices", Materials Science and Engineering: A, Mar. 25, 2007, vols. 449-451, pp. 79-83, doi:10.1016/jmsea.2006.02.384.

\* cited by examiner

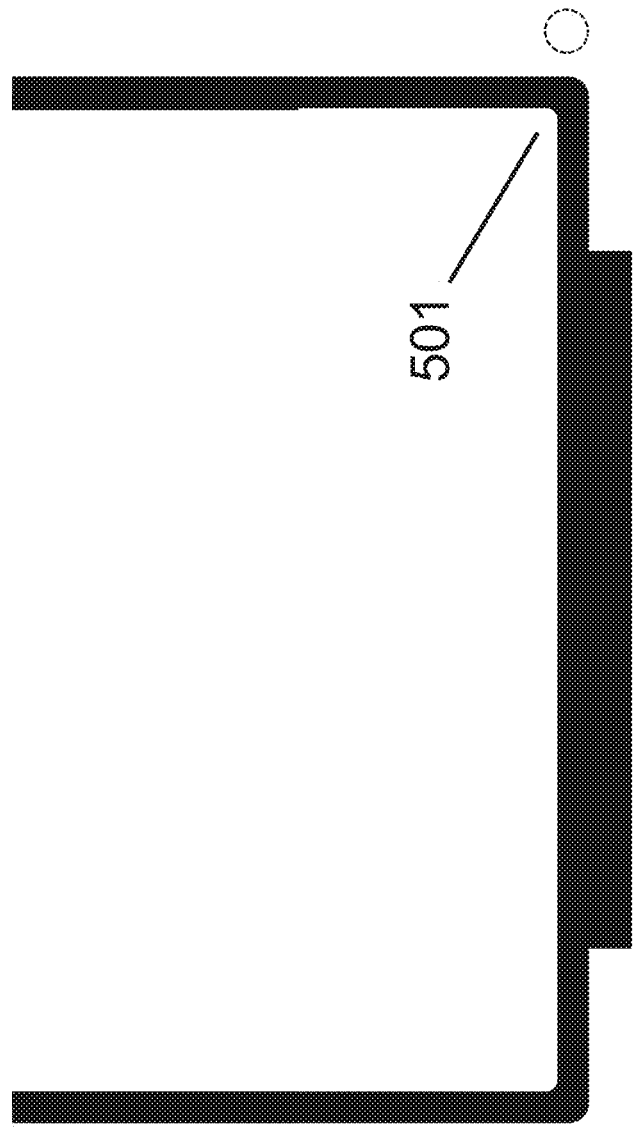

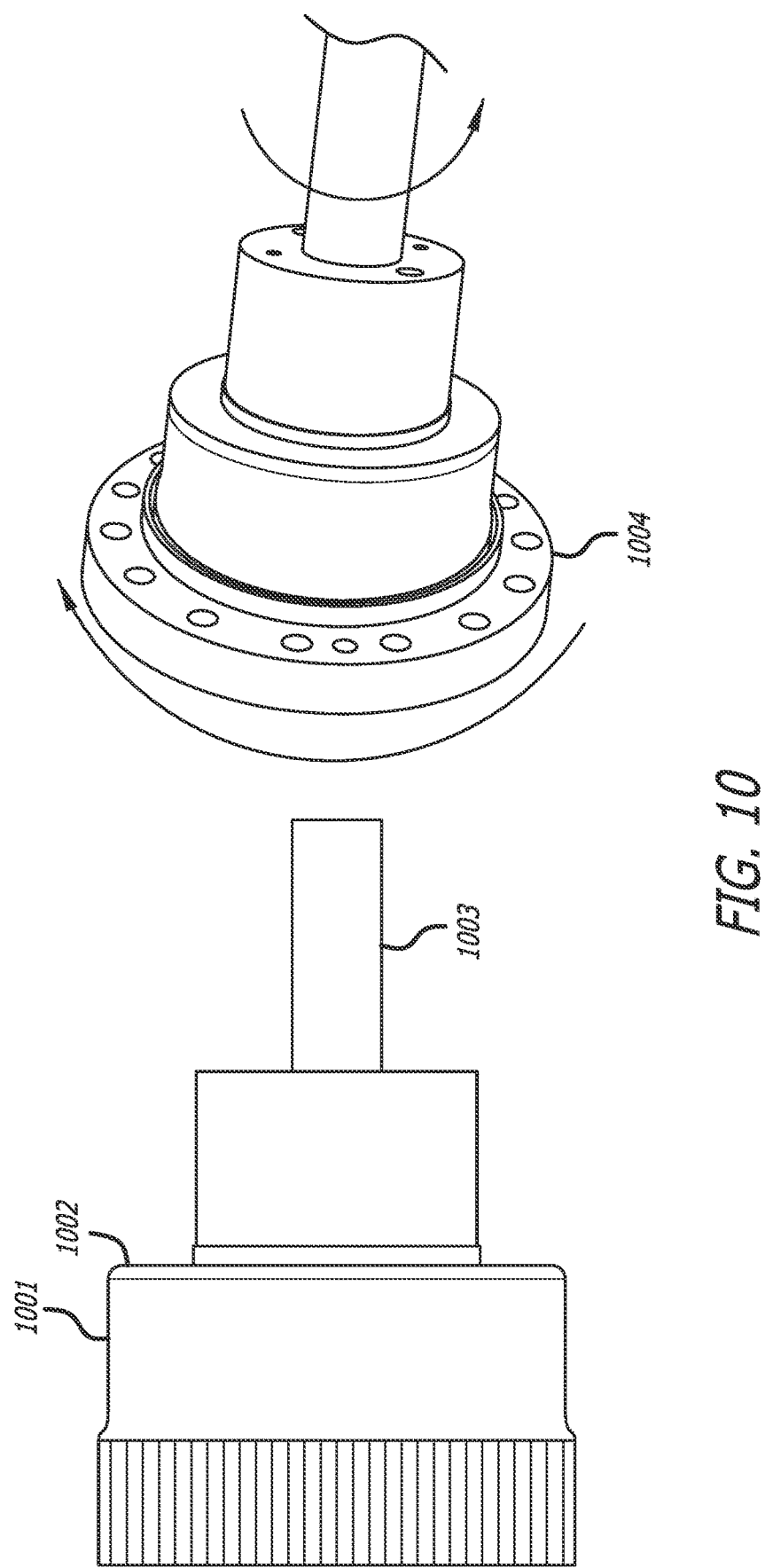

ROUNDED STRAIN WAVE GEAR FLEXSPLINE UTILIZING BULK METALLIC GLASS-BASED MATERIALS AND METHODS OF MANUFACTURE THEREOF

CROSS-REFERENCE TO RELATED APPLICATIONS

The current application claims the benefit of and priority under 35 U.S.C. § 119(e) to U.S. Provisional Patent Application No. 62/811,798 entitled "Design for a Rounded Strain Wave Gear Flexspline Utilizing Bulk Metallic Glass-Based Materials" filed Feb. 28, 2019. The disclosure of U.S. Provisional Patent Application No. 62/811,798 is hereby incorporated by reference in its entirety for all purposes.

GOVERNMENT SPONSORED RESEARCH

This invention was made with government support under Grant Number 80NM0018D004, awarded by NASA (JPL). The government has certain rights in the invention.

FIELD OF THE INVENTION

The present invention generally relates to apparatus and systems for a rounded strain wave gear flexspline utilizing bulk metallic glass-based materials; and more particularly to a change of the flexspline geometry that reduces low cycle fatigue failure.

BACKGROUND OF THE INVENTION

Harmonic drives (HDs) are used widely in robotics as a method for achieving high gear reductions and for driving force transmissions. HDs were developed to take advantage of the elastic dynamics of metals, particularly the expansion of a metal ring to engage gear teeth without exceeding the elastic limit of the ring, which would cause permanent (i.e. plastic) deformation. The HD is made of three components: a wave generator, a flexspline (a.k.a. an inner race), and a circular spline (a.k.a. an outer race) (FIG. 1). The wave generator is an elliptical cam with small ball-bearings built into the outer circumference and is usually attached to the input shaft. The flexspline, is a thin metal cup with external gear teeth and contains a diaphragm at the bottom of the cup for connecting to an output shaft. The circular spline is a steel ring with internal teeth and is usually fixed to a casing. The circular spline has two more teeth than the flexspline and the diameter of the circular spline is slightly larger than the flexspline such that if they were put together without the wave generator, they would be concentric and their teeth wouldn't touch.

In operation, the flexspline is deflected by the motion of the elliptical wave generator, which forces the teeth at the major axis of the ellipse to engage with the circular spline (while the teeth at the minor axis are completely disengaged). When the wave generator completes 180 degrees of motion, the flexspline has moved by one tooth relative to the circular spline. The movement of the flexspline is the output power.

HDs have many characteristics that make their use critical in robotics applications. They have high-speed reduction ratios of 1/30 to 1/320, which provides high efficiency gearing without using complex mechanisms. HDs operate with nearly zero backlash and have extremely high precision. They have small numbers of components and assemble easily and they can generally be small-sized and lightweight. HDs have high torque capacity due to the use of fatigue resistance steel in the flexspline and they have high efficiency.

BRIEF SUMMARY OF THE INVENTION

Methods and systems for designing low cost wave generator for metal strain wave gearing are illustrated.

Many embodiments are directed to a cup-type flexspline for a metal strain wave gear comprising, a base, and a vertical wall, where the vertical wall transitions through a curvature to the base, where an input shaft is disposed at the base; wherein the vertical wall is circular with an outer wall diameter, where the flexspline maintains circularity along the rotational axis of the vertical wall; where the maximum radius of curvature at the base of the cup is at least 10% of the diameter of the flexspline in accordance with the equation:

$$\text{Maximum radius of curvature} = \frac{\text{(Diameter of outer wall of flexspline)} - \text{(Diameter of input shaft)}}{2}$$

In many other embodiments, the radius of curvature is between about 15% to about 20% of the diameter of the flexspline.

In still many other embodiments, the flexspline has a flush input base.

In yet many other embodiments, the flexspline has a hemispherical base curvature.

In still yet many other embodiments, the flexspline has an elliptical base curvature.

In still yet many other embodiments, the flexspline comprises a bulk metallic glass-based material.

In further embodiments, the bulk metallic glass-based material is a bulk metallic glass.

In yet many embodiments, the bulk metallic glass-based material is a bulk metallic glass matrix composite.

In still yet many other embodiments, the flexspline has a fatigue life of at least 10% longer than a flexspline with the radius of curvature between about 1% to about 2% when run at the same torque.

In still yet other embodiments, the flexspline is formed using a net shape process.

In still yet many other embodiments, the flexspline forming technique is one of: an injection molding technique; a die casting technique; a 3D printing technique; a thermoplastic forming technique; a blow molding technique; a discharge forming technique; a metal injection molding technique; a pressing with powder technique; a suction casting technique; and a forming from sheet metal technique.

In still yet many other embodiments, the flexspline comprises a brittle material, wherein the brittle material has a fracture toughness less than about 50 MPa $m^{1/2}$.

In still yet many other embodiments, the flexspline comprises a metal alloy, wherein the metal alloy has less than about 10% ductility in a tension test.

In still yet many other embodiments, the flexspline comprises at least one of tool steel, nanocrystalline metals, nanograined metals, ceramics, and metal matrix composites.

In still yet many other embodiments, the flexspline comprises a laminate of at least two materials.

In still yet many other embodiments, the laminate material comprises at least one of metal, and carbon fiber with a metal coating.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 5 illustrates the cross-section of a machined steel size CSF-20 flexspline showing a radius of curvature in accordance with the prior art.

FIG. 10 illustrates a BMG flexspline connected to an input shaft and then to an outer spline to drive torque, where sharp corners are removed in accordance with embodiments.

DETAILED DESCRIPTION OF THE INVENTION

Figure 1:
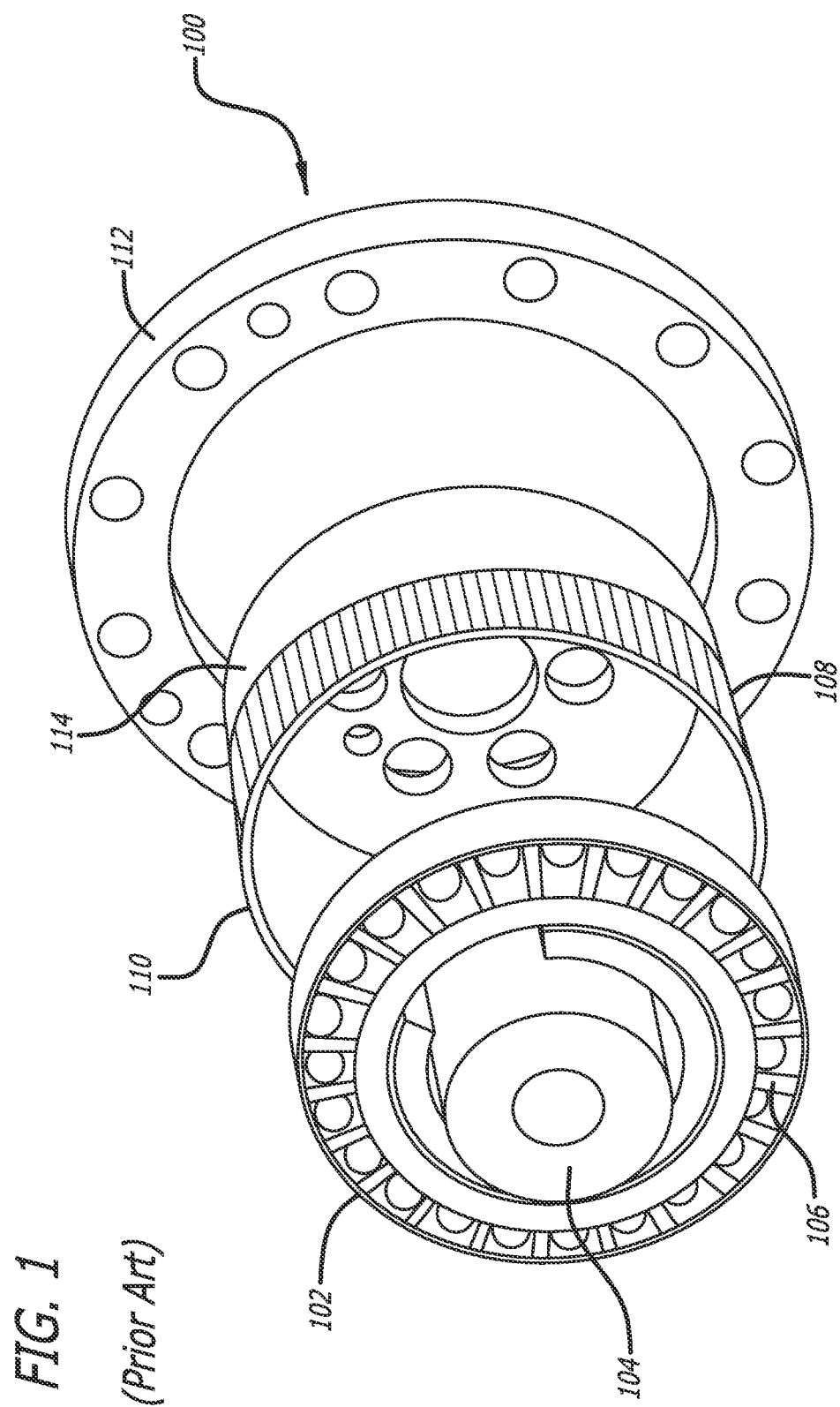
FIG. 1 illustrates a strain wave in accordance with the prior art.

Turning now to the drawings, cup-type flexsplines for metal strain wave gears, and systems and methods for their design and manufacture, are described. In many embodiments, the cup-type flexspline has a base and a vertical wall, where the vertical wall transitions through a curvature to the base. An input shaft locates at the base of the flexspline and has a diameter. The vertical wall is in a circular shape with an outer wall diameter, and the flexspline maintains circularity along the rotational axis of the vertical wall. Many embodiments of the invention describe a flexspline that the cup of the flexspline is free from sharp edges and with a rounded bottom with curvature maximized based on the geometry of the flexspline. Many embodiments describe the maximum radius of curvature at the base of the cup is at least 10% of the diameter of the flexspline. Many other embodiments highlight that the radius of curvature is between about 15% to about 20% of the diameter of the flexspline. Flexsplines according to such embodiments demonstrate improved fatigue life of at least about 10% over designs with sharp angles between the base and the wall when run at the same torque.

In many embodiments, the flexspline has a hemispherical base curvature. In some other embodiments, the flexspline has an elliptical base curvature. In some embodiments, the flexspline has a flush input base. In some other embodiments, the flexspline has two different spherical radii of curvature. Many embodiments describe that the flexspline is made of bulk metallic glass-based material. Many embodiments reveal that the bulk metallic glass-based material can be made from near or net-shaped processes, such as injection molding, die casting, 3D printing, thermoplastic forming, blow molding, discharge forming, metal injection molding, pressing with powder, suction casting, forming from sheet metal or a variety of other processes whereby feedstock is formed into the flexspline in a single step without significant machining. In many embodiments, the flexspline is made from a brittle material with a fracture toughness of less than about 50 MPa m$^{1/2}$. In some other embodiments, the flexspline is made from a metal alloy with less than about 10% ductility in a tension test. In some other embodiments, the flexspline is made from tool steel, nanocrystalline metals, nanograined metals, ceramics, or metal matrix composites.

Harmonic drives are one of the driving factors in the early formulation of spacecraft design because they limit the size of the spacecraft. Harmonic drives are also used very heavily on Jet Propulsion Lab rovers, including many that were integrated into the Mars Exploration Rovers (MER). Developing low cost harmonic drives or high performance drives is game-changing for future NASA missions and for terrestrial robotics.

Harmonic drives were developed to take advantage of the elastic dynamics of metals, particularly the expansion of a metal ring to engage gear teeth without exceeding the elastic limit of the ring, which would cause permanent (i.e. plastic) deformation. The harmonic drive is made of three components: a wave generator, a flexspline (a.k.a. an inner race), and a circular spline (a.k.a. an outer race).

FIG. 1 illustrates an exploded view of a typical strain wave gear that can be fabricated from BMG-based materials in accordance with embodiments of the invention. In particular, the strain wave gear 100 includes a wave generator 102, a flexspline 108, and a circular spline 112. The illustrated wave generator 102 includes a wave generator plug 104 and a ball bearing 106. Importantly, the wave generator plug 104 is elliptical in shape, and is disposed within the ball bearing 106 so that the ball bearing 106 conforms to the elliptical shape. In this arrangement, the outer race of the ball bearing 106 can rotate relative to the wave generator plug 104.

In the illustrated embodiment, the flexspline 108 is depicted as being in the shape of a cup; notably, the outer rim of the cup includes a set of gear teeth 110. In the illustration, the flexspline is fitted over the ball bearing, such that the outer rim of the flexspline conforms to the aforementioned elliptical shape. Note that in this arrangement, the ball bearing allows the flexspline to rotate relative to the wave generator plug. The circular spline, 112 is in the shape of a ring; importantly, the inner perimeter of the ring includes a set of gear teeth. Normally, there are more gear teeth on the circular spline 114 than on the flexspline 110. In many instances there are two more gear teeth on the circular spline 112 than on the flexspline 108. Typically, the flexspline 108 is fitted within the circular spline 112 such that the gear teeth of the flexspline 110 engage the gear teeth of the circular spline 114. Notably, because the gear teeth of the flexspline 110 conform to an elliptical shape, only the gear teeth proximate the major axis of the elliptical shape engage the gear teeth of the circular spline 114 in the usual case. Conversely, the gear teeth of the flex spline 110 that are proximate the minor axis of the elliptical shape are disengaged from the gear teeth of the circular spline 114. In many instances, 30% of the gear teeth of the flexspline 110 are engaged with the gear teeth of the circular spline 114. With this arrangement, the wave generator plug 104 can rotate in a first direction about the central axis of the elliptical shape, and thereby cause the flexspline 108 to rotate in a second opposite direction and at a different rate of rotation (generally slower) about the central axis of the elliptical shape. This can be achieved as the flexspline 108 is made of a flexible material that can accommodate the deflections that may result from the rotation of the wave generator plug 104.

Figure 3B:
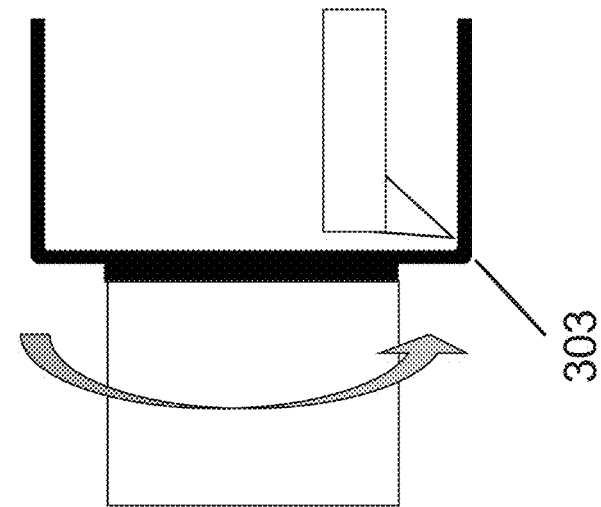
FIGS. 3A-3B illustrate flexsplines manufactured from solid billets or castings using conventional machining processes, such as lathing, milling, or grinding in accordance with the prior art.
Figure 3A:
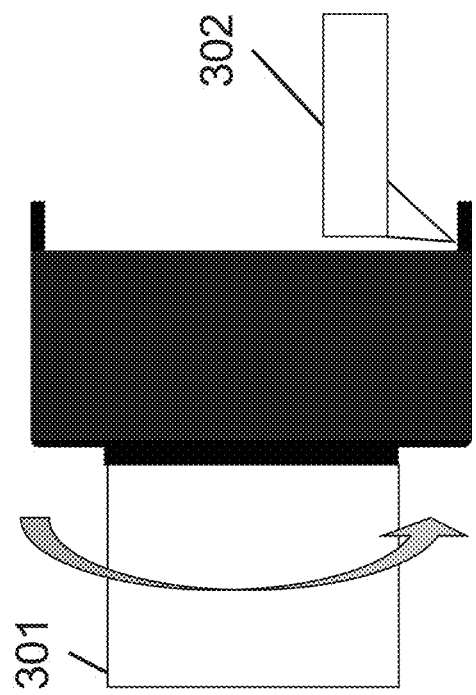

The primary method by which strain wave gear flexsplines are manufactured is through the machining of steel. FIGS. 3A-3B illustrate methods where flexsplines are manufactured from solid billets or castings using conventional machining processes, such as lathing, milling, or grinding. A lathe 301 rotates a flexspline about an axis of rotation to perform cutting by the cutting tool 302. A straight edge 303 of the flexspline is shown in FIG. 3B. In this method, machining a large radius of curvature is challenging compared to a straight edge.

Figure 4:
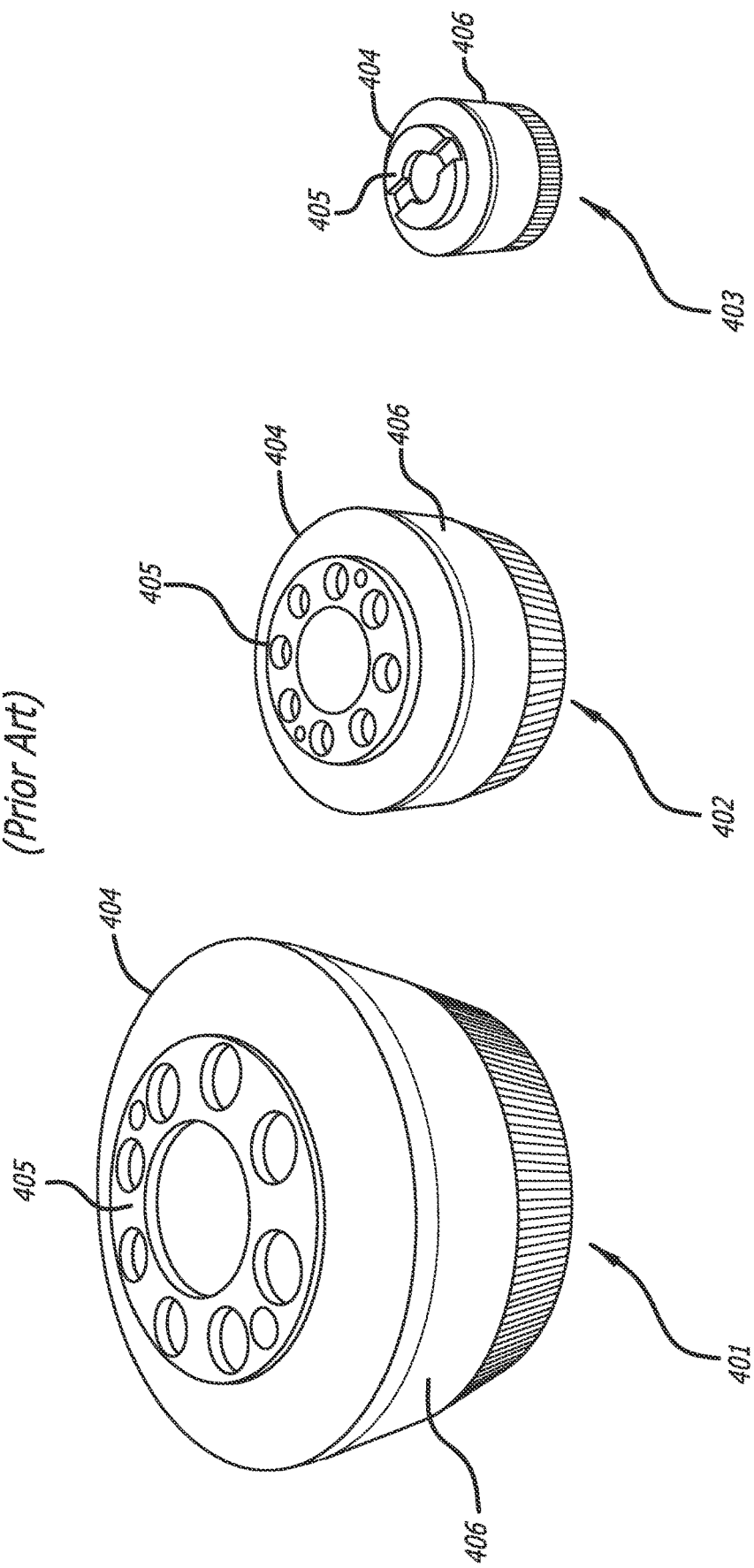
FIG. 4 illustrates three common sizes of strain wave gear flexsplines made from machined steel, where the flexspline has a flat input that interfaces with a component to transmit torque in accordance with the prior art.

The vast majority of current commercial flexsplines are made of steel, which is known for its combination of high toughness and wear resistance. Typical cup-type flexsplines are made with a vertical wall that transitions through a 90 degree angle to a base where an input shaft is located. FIG. 4 depicts three common sizes of strain wave gear flexspline: 401 is CSF-32 flexspline, 402 is the CSF-20 flexspline, and 403 is CSF-8 flexspline. Each flexspline is made from machined steel, and has a radius of curvature 404 between the base of the cup 405 and the wall 406 of about 1% to about 2% of the diameter of the wall. The flexspline has a flat input that interfaces with a component to transmit torque. The base 405 is preferably to be flat to make a mating interface. Due to the high toughness of steel, the small radius of curvature 404 is sufficient to prevent fracture.

The torque that the flexspline can support is a function of the size of the flexspline cup, its length and the number of teeth on the flexspline outer wall. Due to the very high toughness of steel and the limitations of conventional machining, a very small radius of curvature is added to the bottom of the flexspline cup, typically about 1% to about 2% of the diameter of the flexspline. FIG. 5 shows the cross-section of a typical machined steel size CSF-20 flexspline with a radius of curvature 501 of about 1 millimeter, which is about 1% to 2% of the diameter of the flexspline. Machining larger radii of curvature is more difficult due to the necessity of keeping the flexspline perfectly symmetric along its rotational axes. Due to the high toughness of steel, the small radius of curvature is not a normal location of failure of the flexspline, which normally fails due to buckling of the flexspline wall or the degradation of the flexspline teeth. In operation, a steel flexspline is rarely expected to crack or fail due to a stress concentration.

Despite the high performance of steel in the flexspline, it is expensive to manufacture due to the difficulty with machining steel, the high-tolerance features, and the very thin wall. Bulk metallic glasses (BMGs) have been demonstrated to be ideal candidates for flexsplines because they can be manufactured using near or net-shaped processes, such as injection molding, die casting, thermoplastic forming, metal injection molding or a variety of other processes whereby feedstock is formed into the flexspline in a single step without significant machining. (See e.g., U.S. Pat. No. 9,328,813 B2 to Hofmann et al., U.S. Pat. No. 10,151,377 B2 to Hofmann et al., U.S. patent application Ser. No. 15/918,831 to Hofmann et al., U.S. patent application Ser. No. 62/811,765 to Hofmann et al.; the disclosures of which are hereby incorporated by reference.)

Figure 6B:
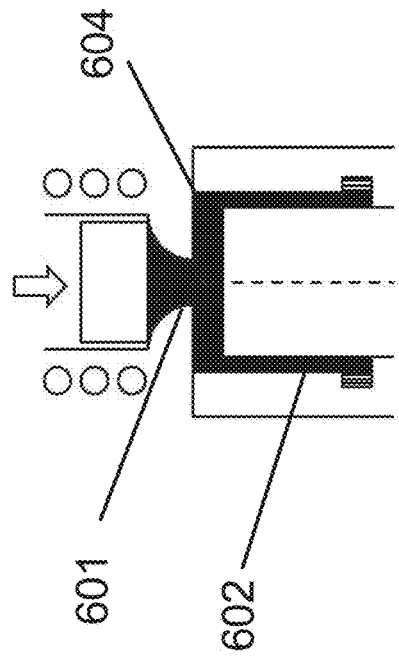
FIGS. 6A-6D illustrate a stress concentration is created when replicating a machined steel flexspline during injection molding of bulk metallic glass (BMG) in accordance with embodiments.
Figure 6D:
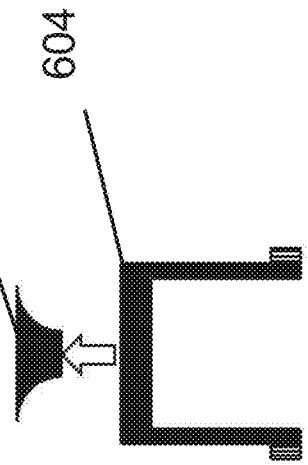
Figure 6A:
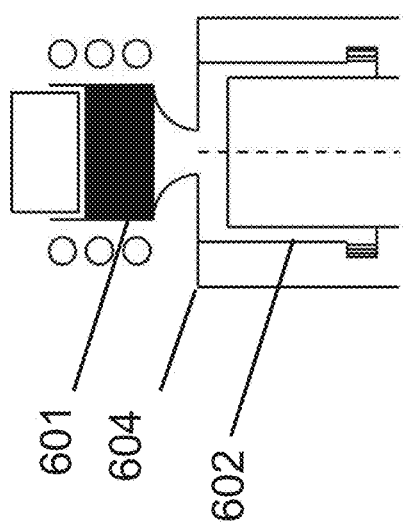
Figure 6C:
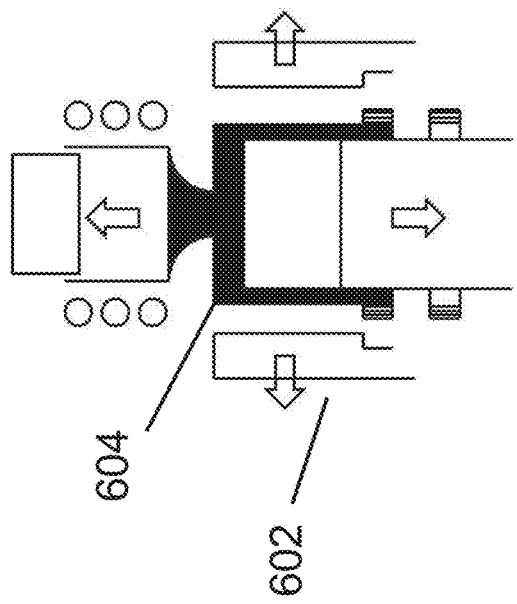
Figure 7:
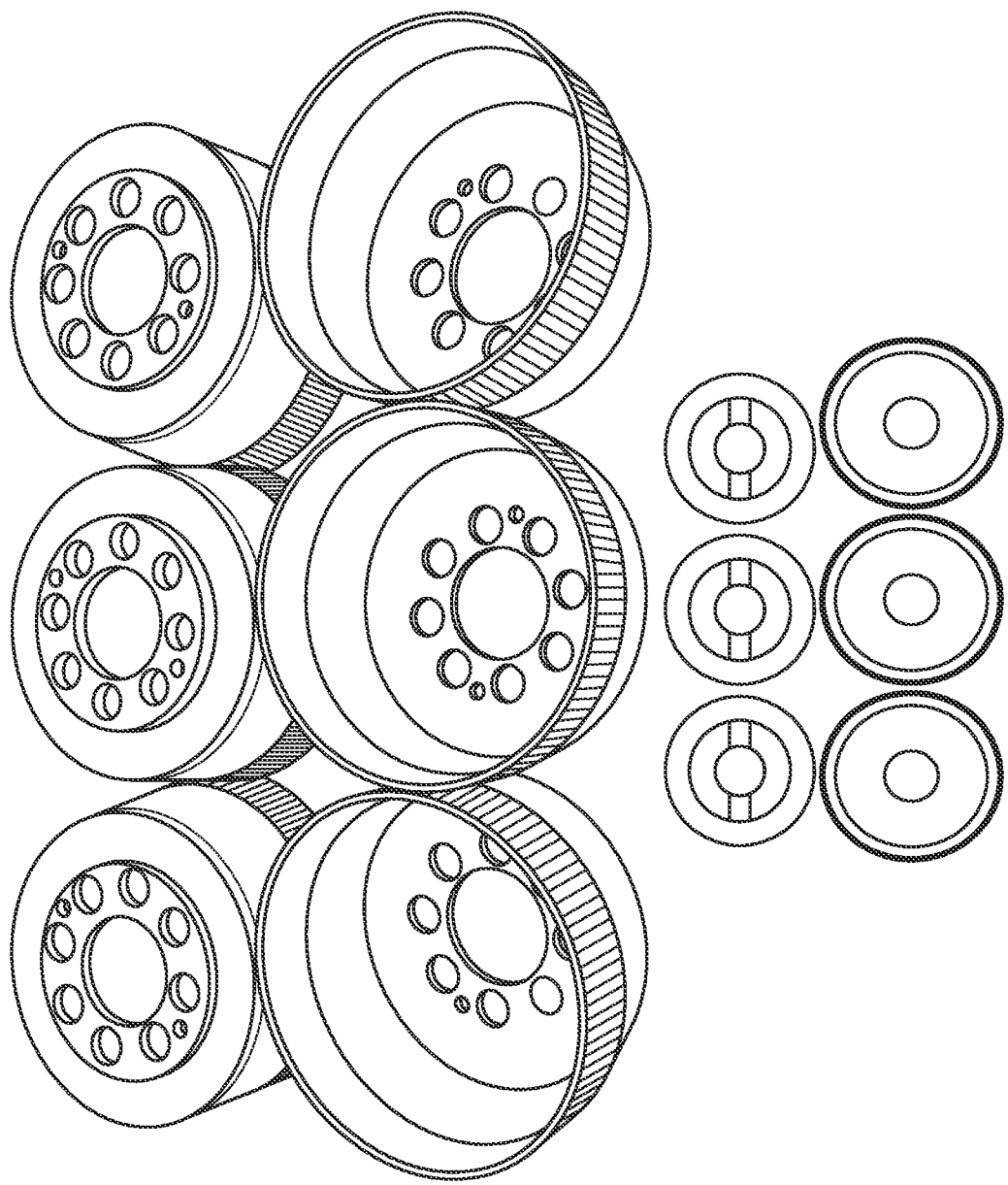
FIG. 7 illustrates injection molded bulk metallic glass flexsplines, where these parts are cast to replicate the shape of the machined steel versions, which are designed to maximize torque due to the straight walls in accordance with embodiments.

BMG-based material flexsplines have been manufactured to mimic the shape of the steel flexsplines, which contain several locations of stress concentrations. As an example, FIGS. 6A-6D illustrate an injection molding technique that can be implemented to form a flexspline of a strain wave gear in accordance with embodiments of the invention. In particular, FIG. 6A depicts that a molten BMG-based material 601 that has been heated to a molten state and is thereby ready to be inserted into a mold 602. The mold 602 helps define the shape of the flexspline to be formed. FIG. 6B depicts that the molten BMG-based material 601 is pressed into the mold 602. FIG. 6C depicts that the mold 602 is released after the BMG-based material has cooled. FIG. 6D depicts that any excess flash 603 is removed. Thus, it is depicted that a strain wave gear component is fabricated using direct casting techniques in conjunction with a BMG-based material in accordance with embodiments of the invention. Note that the straight edge of the flexspline 604 from replicating the steel flexspline models creates stress concentration. FIG. 7 shows the BMG-based material flexsplines made with injection molding technique. The flexsplines have been cast to replicate the shape of the machined steel versions, which are designed to maximize torque due to the straight walls.

Figure 8A:
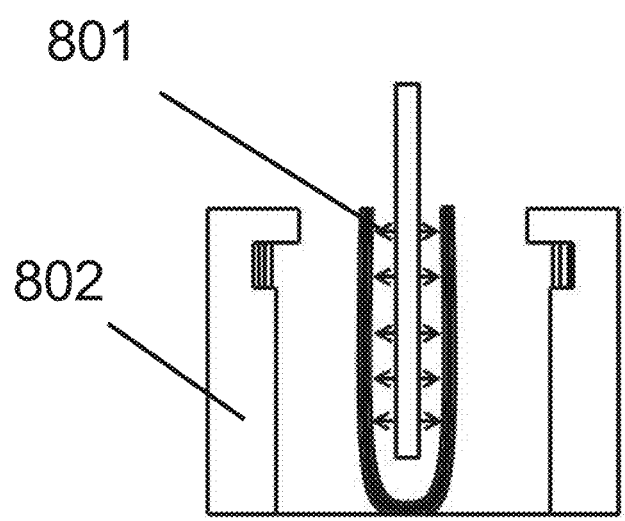
FIGS. 8A-8C illustrate a blow molding process that thermoplastically forms BMGs into flexsplines, where replicating the steel version creates sharp edges in accordance with embodiments.
Figure 8B:
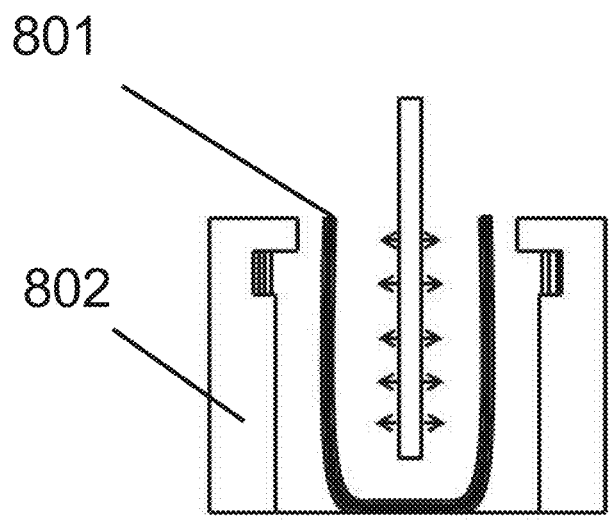
Figure 8C:
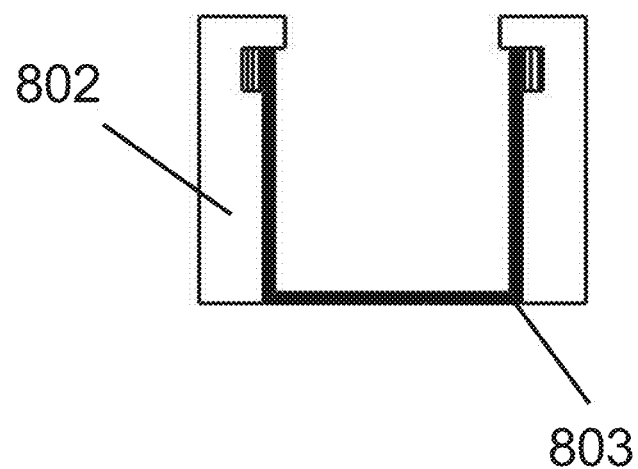

FIGS. 8A-8C illustrate the forming of a flexspline using blow molding techniques. In particular, FIG. 8A depicts that a BMG-based material 801 is placed within a mold 802. FIG. 8B depicts that the BMG-based material 801 is exposed to pressurized gas or liquid that forces the BMG-based material to conform to the shape of the mold 802. Typically, a pressurized inert gas is used. The BMG-based material 801 is usually heated so that it is sufficiently pliable and can be influenced by the pressurized gas or liquid. Again, any suitable heating technique can be implemented in accordance with embodiments of the invention. FIG. 8C depicts that due to the force of the pressurized gas or liquid, the BMG-based material conforms to the shape of the mold 802. Replicating the steel flexspline creates sharp edges 803 in the BMG-based flexspline.

However, unlike steel, BMG-based materials are known for having much lower fracture toughness and fatigue life. In fact, BMG flexsplines tend to fail via cracking or shearing at much lower number of cycles than their steel counterparts. BMG-based materials are typically associated with fracture toughness less than about 50 MPa $m^{1/2}$ whereas steel is normally greater than about 100 MPa $m^{1/2}$. Fatigue strengths of steel are typically greater than about 20% of their yield strength whereas BMG-based materials normally fail at less than about 10% of their yield strengths at about 107 cycles.

Figure 9B:
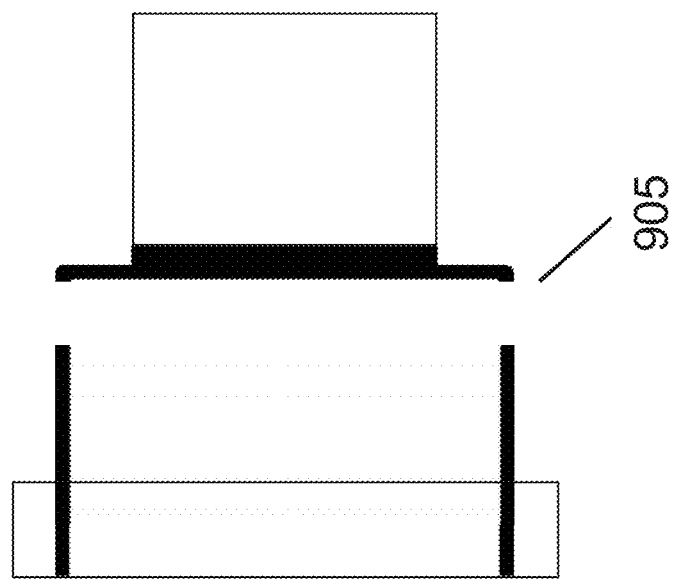
FIGS. 9A-9B illustrate a BMG flexspline loaded and the subsequent low cycle fatigue failure due to the low toughness of the BMG in accordance with embodiments.
Figure 9A:
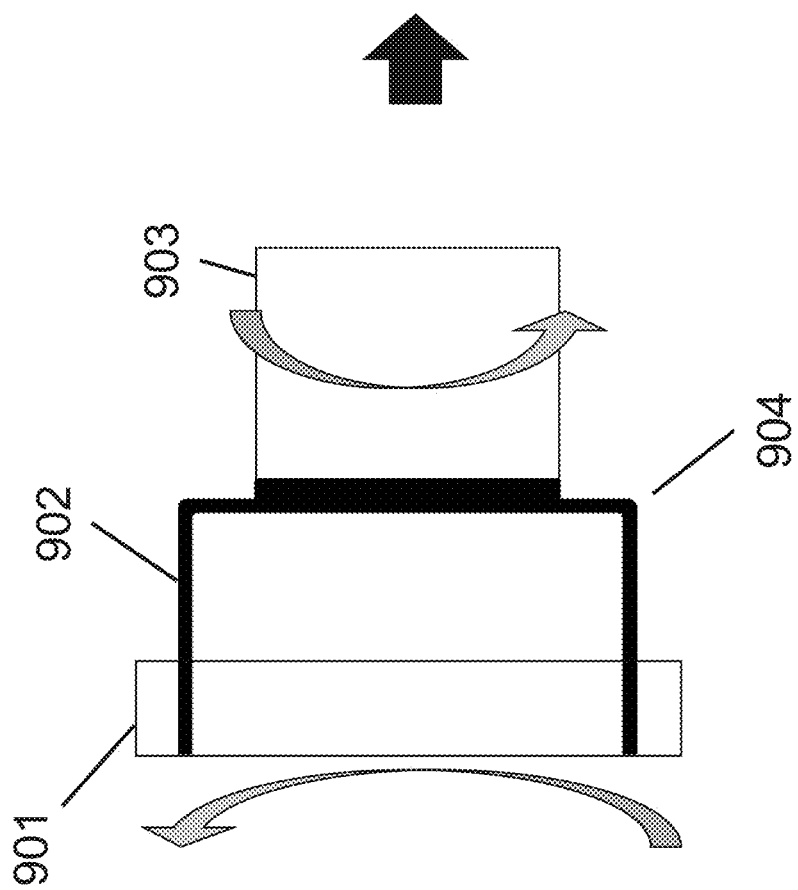

As an example, FIGS. 9A-9B illustrate schematically a BMG flexspline fatigue failure due to the low toughness of the BMG-based material. FIG. 9A depicts the outer spline 901 rotates counter clockwise along the axis of rotation of the flexspline, while the input shaft 903 rotates clockwise along the axis of rotation. The brittle BMG-based material flexspline 902 is loaded. The straight edge of the flexspline creates the stress concentration 904. FIG. 9B depicts the low cycle fatigue failure 905 due to the low toughness of the BMG-based material. For brittle materials, like BMG, stress concentration creates premature failure under loading.

Figure 11:
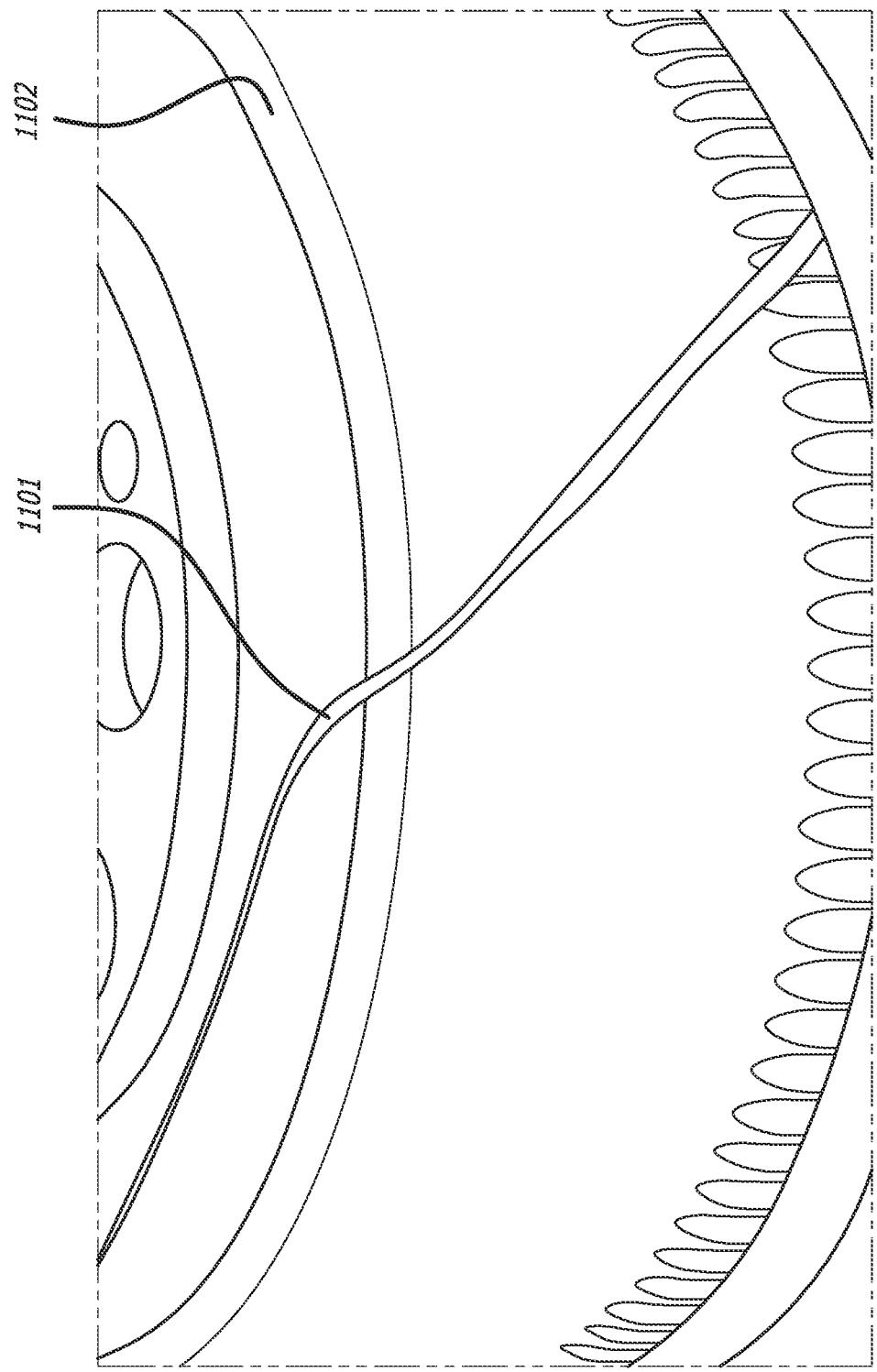
FIG. 11 illustrates a low cycle fatigue crack in a CSF-20-50 BMG flexspline after approximately 20,000 cycles at 30 Nm of torque, where the crack originates from the stress concentration at a small radius of curvature in accordance with embodiments.
Figure 12:
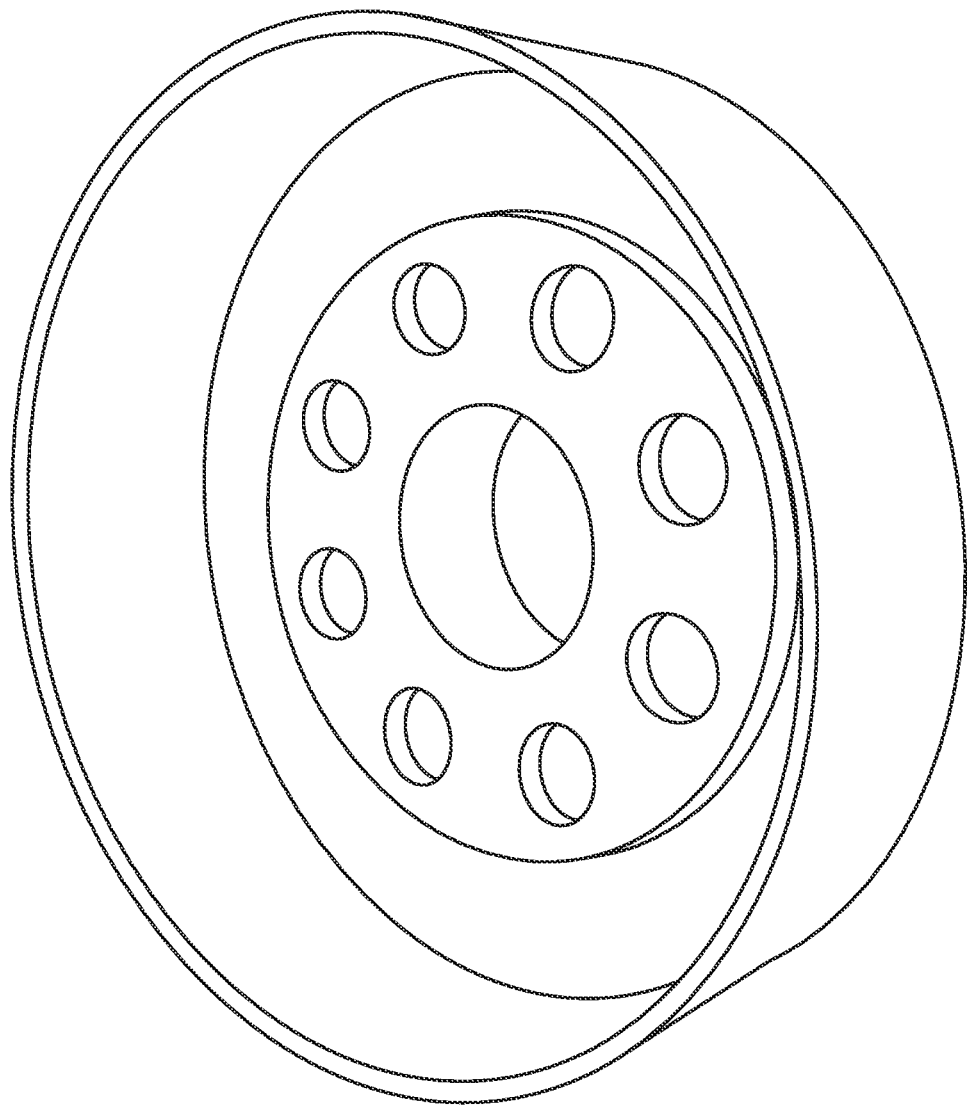
FIG. 12 illustrates a BMG flexspline sheared off under load at the location of a stress concentration in accordance with embodiments.

FIG. 10 illustrates the stress concentration in a BMG-based material flexspline. A BMG flexspline 1001 is connected to an input shaft 1003, and then to an outer spline 1004 to drive torque. Due to the brittle nature of the BMG, sharp corners 1002 are locations of failure. FIG. 11 shows a fatigue crack in a CSF-20-50 BMG flexspline. The low cycle fatigue crack 1101 appears in the flexspline after approximately 20,000 cycles at 30 Nm of torque. The crack originates from the stress concentration at the small radius of curvature 1102. FIG. 12 shows a BMG flexspline that has been sheared off under load at the location of a stress concentration. These types of failure do not occur in steel flexsplines.

Although BMGs can be cast for potentially much lower cost than steel, their brittle nature makes them perform worse, despite their higher strength (about 2000 MPa compared to about 500 MPa for steel), higher wear resistance, lower elastic modulus (about 90 GPa compared to about 215 GPa for steel), higher elasticity (about 2% compared to about 0.1% for steel), and corrosion resistance. Improving the design of the flexspline could simultaneously improve performance and reduce the difficulty with net-shaped casting.

Figure 2:
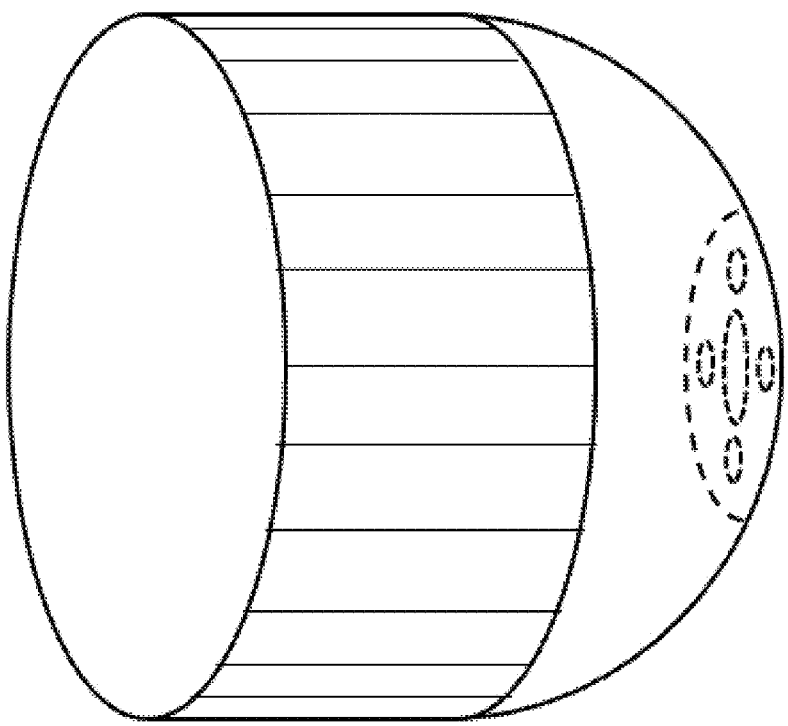
FIG. 2 conceptually illustrates a flexspline geometry configured to reduce low cycle fatigue failure when the flexspline is made from a brittle metal in accordance with embodiments.

Embodiments Implementing Rounded Bulk Metallic Glass-Based Materials Flexsplines Many embodiments of the invention describe a strain wave gear flexspline where the cup of the flexspline is free from sharp edges and with a rounded bottom with curvature maximized based on the geometry of the flexspline (FIG. 2). Compared to a steel flexspline, the new design will have the same outer diameter, the same number of teeth and profile, the length of the flexspline, the same size and shape of the input shaft/base, the same wall thickness near the teeth, but will have a rounded bottom where the input shaft/base transitions to the straight wall of the flexspline. Embodiments demonstrate that the large radius of curvature of the flexspline improves the performance of a BMG-based material flexspline by reducing low cycle fatigue failures due to stress concentrations.

Many embodiments of the invention refer to bulk metallic glass (BMG) as an alloy which can be quenched into a vitreous state at a relatively large casting thickness (generally over 1 mm). BMGs can also be referred to as amorphous metals (AMs) and their composites as amorphous metal composites (AMCs). Many other embodiments of the invention refer to in-situ composite or bulk metallic glass matrix composite (BMGMC) as an alloy which, upon rapid cooling (cooling rate from about 1K/s to about 1000 K/s), chemically partitions into two or more phases, one being an amorphous matrix and the other(s) being crystalline inclusions. The term "bulk metallic glass-based materials" (BMG-based materials) includes both BMGs and BMGMCs.

Given that shearing and cracking is not a normal mode of failure for steel, changing the radius of curvature of the flexspline cup as described in many of the embodiments is not a conventional approach. Moreover, almost all flexsplines are machined from steel and small radii of curvatures are far easier to machine than large ones, especially when circularity must be maintained to high tolerances. In addition, flexspline cups having small radii of curvature maximize the operating torque of the strain wave gear. Nevertheless, embodiments implementing rounded edges are shown to improve the fatigue life of a BMG flexspline as compared to a straight wall cup. Moreover, the rounded shape reduces the net shaped manufacturing, as inserts normally used for casting around release much easier from the mold when they are round, as opposed to sharp. Accordingly, embodiments implementing brittle materials, like BMGs and others, simultaneously improve castability and fatigue life by increasing the curvature of the flexspline cup.

Rounded flexsplines according to embodiments decrease the performance of the strain wave gears, because rounded corners do not take as much load as straight walls. The performance of rounded flexsplines is compensated by the use of brittle materials in the flexsplines, which would otherwise crack in straight wall structures. In some embodiments, the brittle materials provide better performance in rounded flexsplines. In some other embodiments, the brittle materials are easier to manufacture. BMGs, according to such embodiments, can be cast into the flexsplines, which lowers the manufacturing cost of flexsplines.

Many embodiments of the invention remove stress concentrations at the base of the flexspline by adding a large radius of curvature to the base of the cup. Many embodiments increase the radius of curvature at the base of the flexspline cup from about 1% to about 2% of the flexspline diameter to at least 10% of the diameter of a standard flexspline while maintaining circularity along the rotational axis. Many other embodiments implement configurations that reduce other sharp edges in the apparatus. In various embodiments, cup-type flexsplines have a maximum radius of curvature of about 15% to about 20% based on the ratio of the input base diameter to the flexspline diameter. In many such embodiments, the maximum radius of curvature can be calculated with Equation 1:

$$\text{Maximum radius of curvature} = \frac{(\text{Diameter of outer wall of flexspline}) - (\text{Diameter of input shaft})}{2}$$

Figure 13:
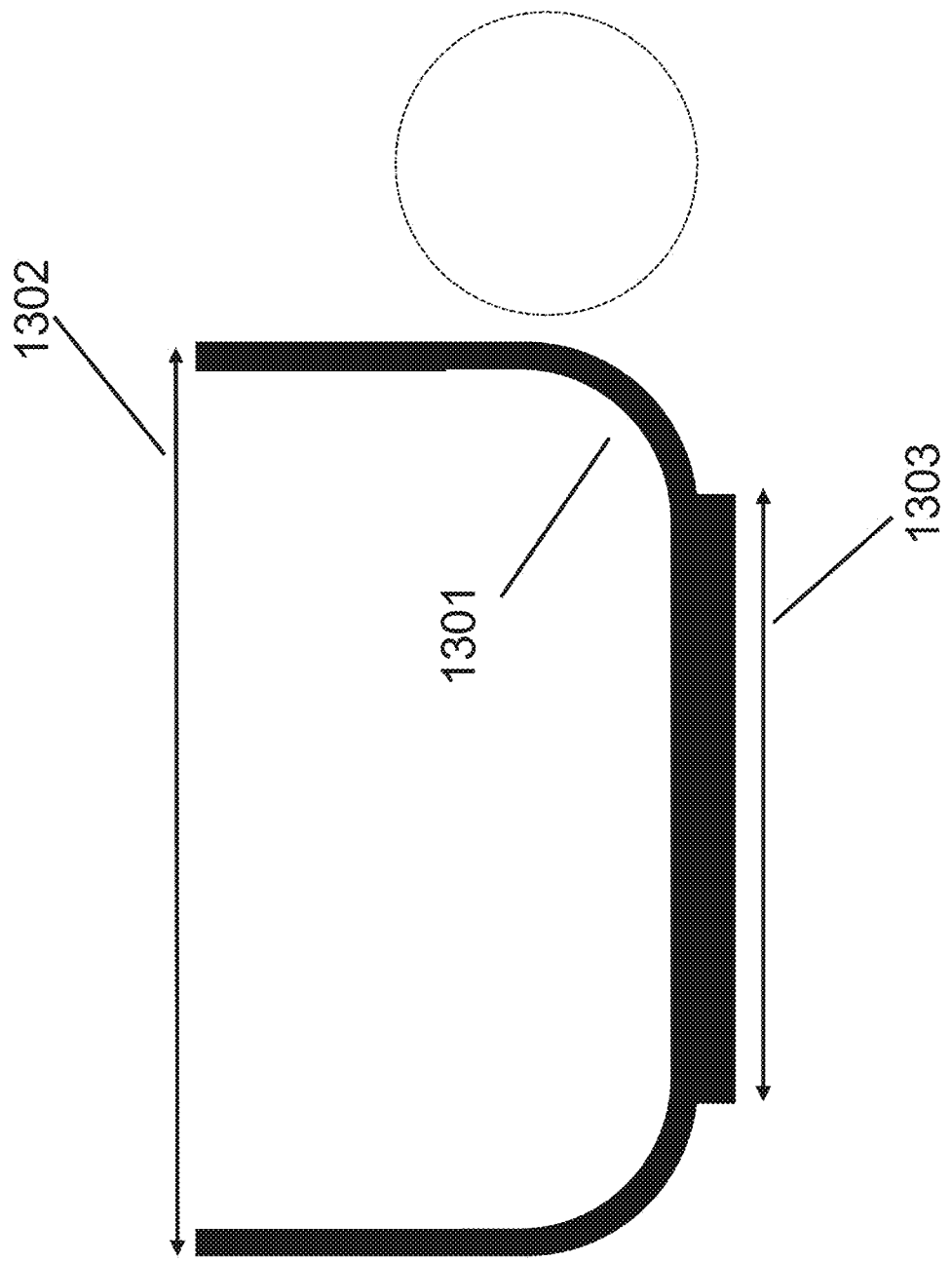
FIG. 13 illustrates the maximum possible radius of curvature at the edge of the cup based on the fixed diameters of the flexspline wall and the input base in accordance with embodiments.

FIG. 13 illustrates a cup-type flexspline with a rounded edge according to many embodiments. Based on the fixed diameter of the flexspline wall and the input base, the maximum possible radius of curvature 1301 at the edge of the cup is 8 millimeter for a size CFS-20 flexspline. Without changing the diameter of the flexspline 1302 or the diameter of the input base 1303, the BMG flexspline can support a radius of curvature between about 15% to about 20% of the diameter of the flexspline. As a comparison, a conventional steel cup-type CFS-20 flexspline as depicted in FIG. 5 has a radius of curvature 501 of about 1 millimeter, which is about 1% to about 2% of the flexspline diameter.

Table 1 lists measurements of the diameter of the flexspline, the diameter of the input shaft/base, the approximate radius of curvature of the machined steel, the maximum radius of curvature possible and the maximum radius of curvature as a percentage of the diameter for three standard sizes of flexsplines. Overall, the radius of curvature of the machined steel is about 1% to about 2% of the diameter of the flexspline. By contrast, embodiments implement radius of curvature between about 15% to about 20% of the flexspline diameter, based on standard sizes. Embodiments demonstrate that the larger curvatures decrease the possible torque on the strain wave gear but reduces the stress concentrations of the BMG, resulting in longer life. Moreover, the rounded shape is easier to cast through near or net-shaped processes, such an injection molding, die casting, blow molding or metal injection molding.

TABLE 1

| Gear size | Diameter of input shaft (mm) | Diameter of flexspline (mm) | Machined Radius of Curvature (mm) | Maximum Radius of Curvature (mm) | Maximum Radius of Curvature as % of Diameter |
|---|---|---|---|---|---|
| CSF-8 | 12.25 | 20 | 0.25 | 3.875 | 19% |
| CSF-20 | 48 | 32 | 1 | 8 | 17% |
| CSF-32 | 81 | 52 | 2 | 14.5 | 18% |

Figure 14A:
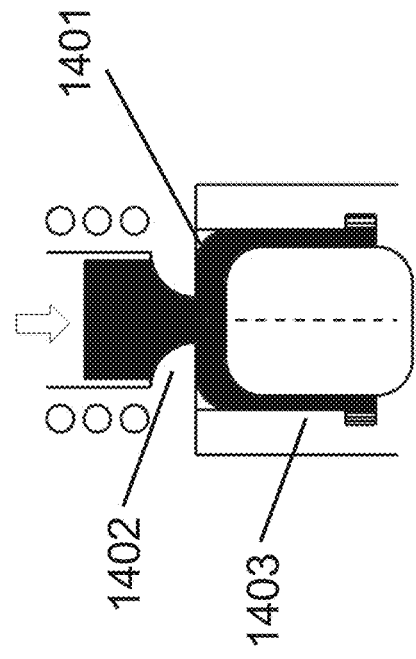
FIGS. 14A-14D illustrate stress concentration reduction by rounding the bottom of the cup in accordance with embodiments.
Figure 14B:
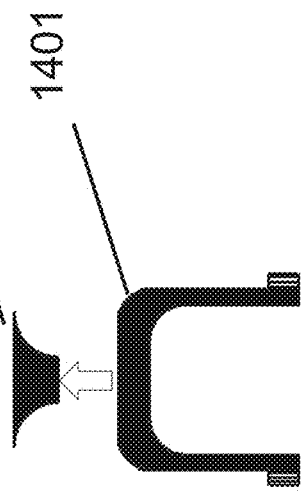
Figure 14C:
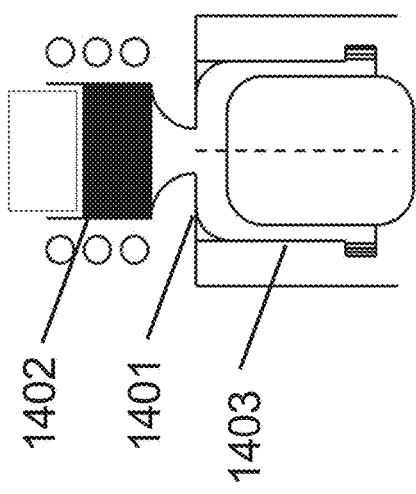
Figure 14D:
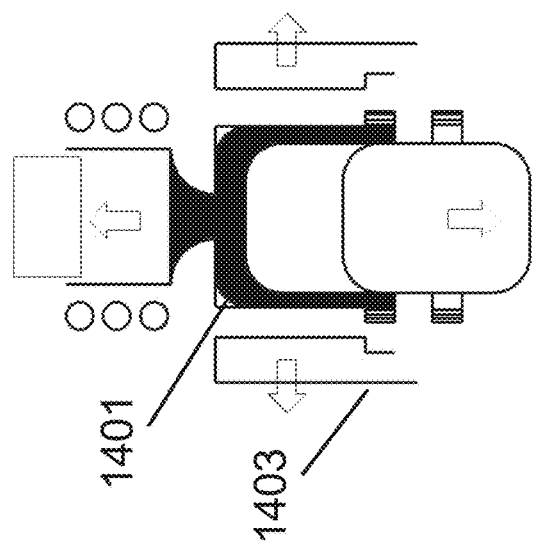

In various embodiments, rounded edge BMG-based material flexsplines are manufactured with direct casting techniques in accordance with embodiments of the invention. Rounded edges are easier to cast than sharp edges. As an example, FIGS. 14A-14D illustrate a modified injection molding process that can be implemented to form a round edge flexspline in accordance with embodiments of the invention. In particular, FIG. 14A depicts a molten BMG-based material 1402 that has been heated to a molten state and is thereby ready to be inserted into a mold 1403. The mold 1403 helps define the shape of the flexspline to be formed to have rounded edges 1401. FIG. 14B depicts that the molten BMG-based material 1402 is pressed into the rounded edge 1401 mold 1403. FIG. 14C depicts that the mold 1403 is released after the BMG-based material has cooled. FIG. 14D depicts that any excess flash 1404 is removed. Note that the rounded edge of the cup of the flexspline 1401 reduces the stress concentration while simultaneously reduces the difficulty with manufacturing.

Figure 15A:
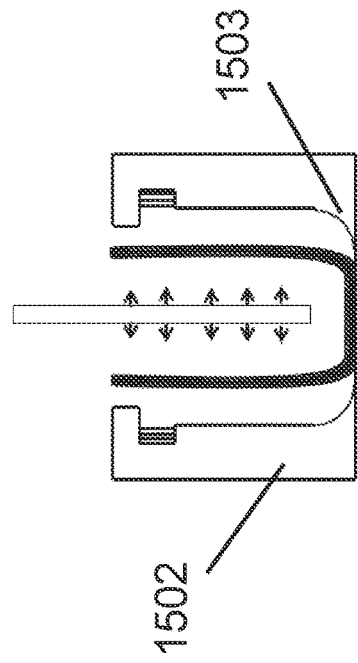
FIGS. 15A-15D illustrate a modified blow molding process that allows a curve to form at the edges of the flexspline in accordance with embodiments.
Figure 15B:
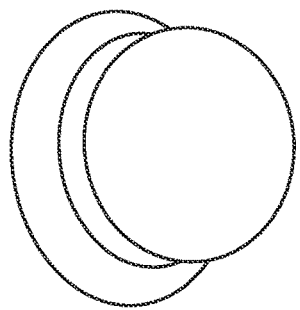
Figure 15C:
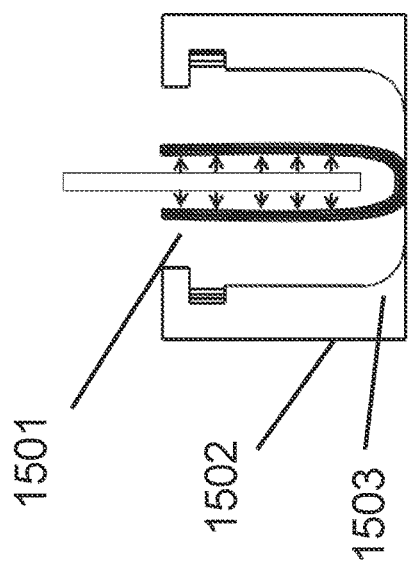
Figure 15D:
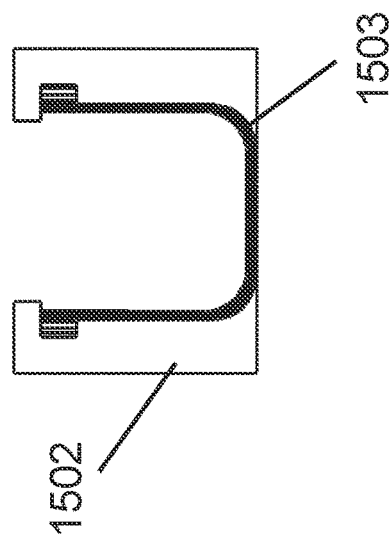

FIGS. 15A-15D illustrate the forming a rounded flexspline using blow molding techniques. In particular, FIG. 15A depicts that a BMG-based material 1501 is placed within a mold 1502 with rounded edges 1503. FIG. 15B depicts that the BMG-based material 1501 is exposed to pressurized gas or liquid that forces the BMG-based material to conform to the shape of the mold 1502. Typically, a pressurized inert gas is used. The BMG-based material 1501 is usually heated so that it is sufficiently pliable and can be influenced by the pressurized gas or liquid. Again, any suitable heating technique can be implemented in accordance with embodiments of the invention. FIG. 15C depicts that due to the force of the pressurized gas or liquid, the BMG-based material conforms to the shape of the mold 1502 with rounded edges 1503. The modified blow molding process allows a curve 1503 to form at the edges of the flexspline. FIG. 15D shows a prototype blow molded flexspline showing the natural tendency to form a hemisphere when expanding. This shape has the largest radius of curvature possible for the given diameter and thus the lowest stress concentration.

Many embodiments describe the flexspline is made at least in part of a bulk metallic glass-based material that has been manufactured into a near or net-shaped flexspline. The fatigue life of the flexspline is improved by at least 10% when run at the same torque as a flexspline made from the same material but with a standard flexspline design created for steel. Many embodiments describe that the BMG can be injection molded, die cast, 3D printed, thermoplastically formed, blow molded, discharge formed, metal injection molded, pressed with powder, suction cast, or formed from sheet metal. In other embodiments, the flexspline has an elliptical base curvature. Many other embodiments describe that the cracking during operation of the flexspline can be suppressed compared to a similar cup with a radius of curvature of about 1% to about 2% of the flexspline diameter.

Many other embodiments describe a flexspline of a cup-type strain wave gear that the radius of curvature at the base of the cup is at least 10% of the diameter of the flexspline. In some embodiments, the flexspline is made from a brittle material with a fracture toughness of less than 50 MPa m$^{1/2}$. In some other embodiments, the flexspline is made from a metal alloy with less than 10% ductility in a tension test. In some other embodiments, the flexspline is made from tool steel, nanocrystalline or nanograined metals, ceramics, metal matrix composites.

Figure 16:
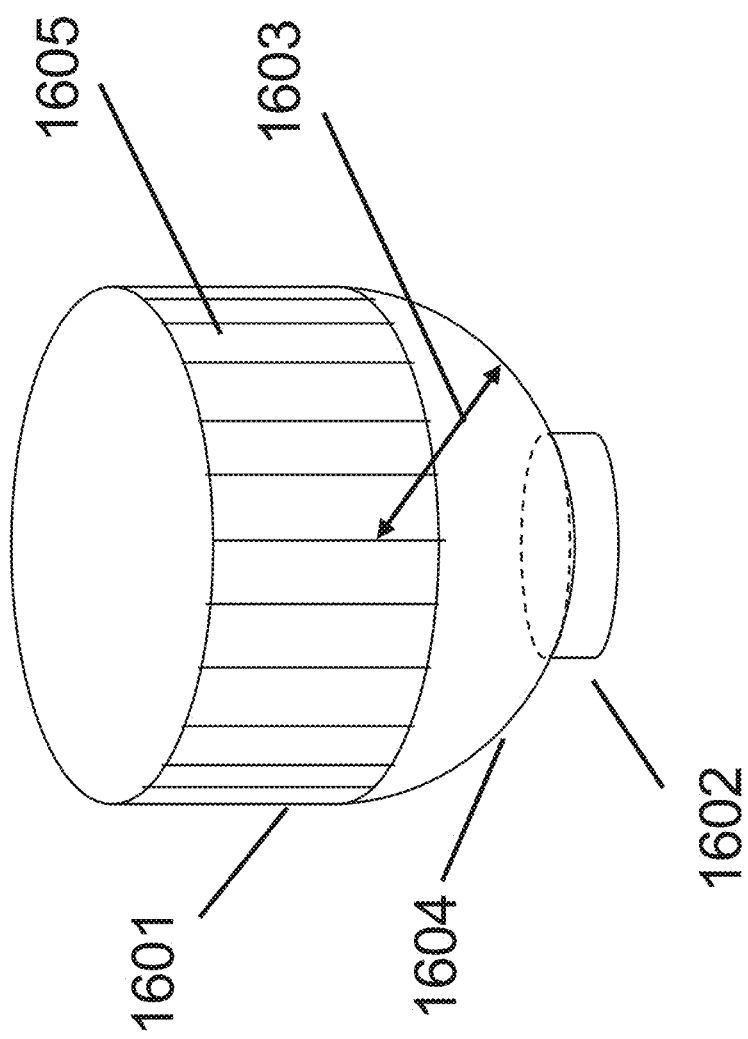
FIG. 16 illustrates a flexspline geometry that has a hemispherical base with a protruding flat input base in accordance with embodiments.

Embodiments Implementing BMG-Based Material Flexsplines With A Spherical Radius Of Curvature To accommodate BMG properties and manufacturing, many embodiments implement flexspline cups with features having reduced sharp edges. FIG. 16 illustrates embodiments where the BMG-based material flexspline has a hemispherical base with a protruding flat input base. In such embodiments, the flexspline has a wall 1605 with a diameter, an input base 1602 with a diameter, and a hemispherical base 1604. More particularly, the flexspline has a flat input base 1602 to connect to the input shaft. The radius of curvature of the hemisphere, according to such embodiments, depends on the diameter of the flexspline and the diameter of the input shaft. Many embodiments describe a radius of curvature of at least 10% of the diameter of the flexspline. Many other embodiments include the flexspline has a spherical radius of curvature. In some embodiments, the rounded base of the flexspline has axial symmetry around the rotational axis of the flexspline. Many other embodiments describe increasing the wall thickness to decrease stress concentrators. In many such embodiments, the diameter at the teeth 1601 of the flexspline and the thickness of the wall near the teeth do not change from the standard flexspline such that the flexspline will fit into a standard outer spline and wave generator. In many embodiments, the BMG flexspline can be used with a standard outer spline and wave generator based on the required size. However, the fatigue life and the manufacturing will be greatly enhanced through the rounding of the base.

Figure 17:
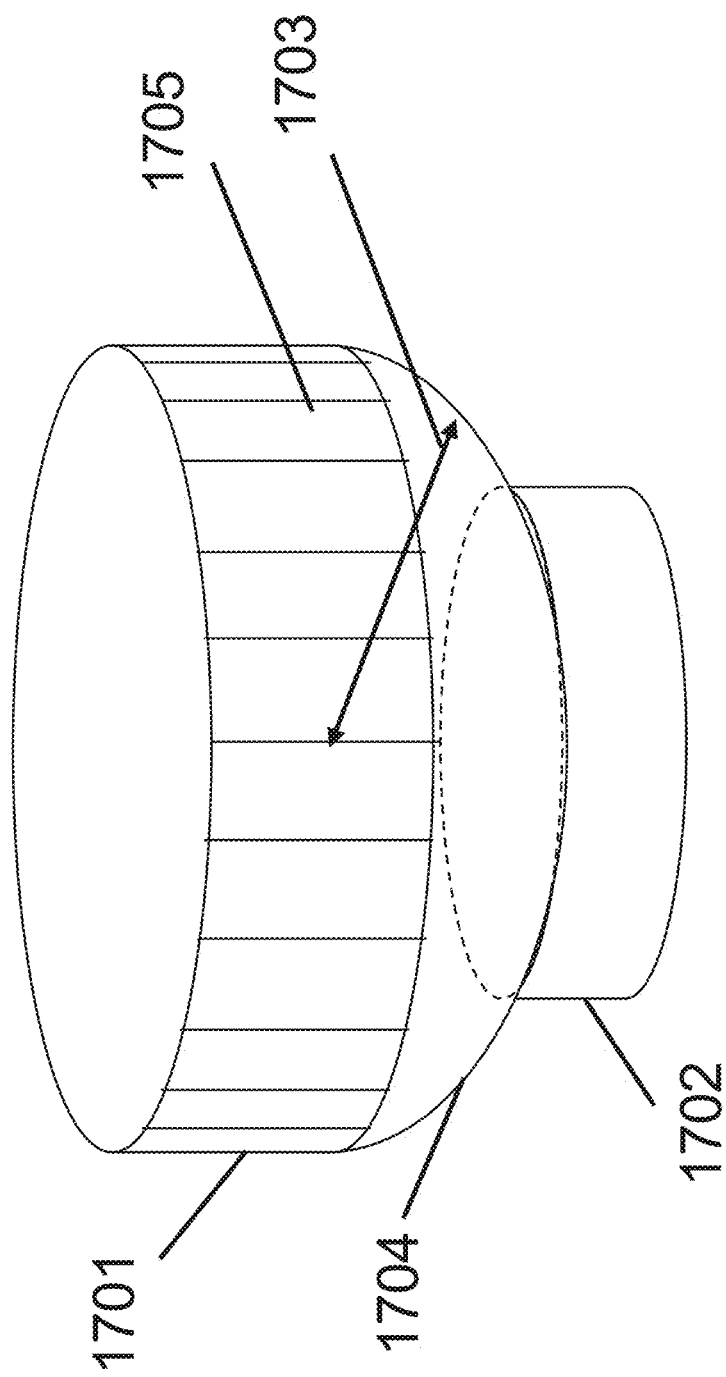
FIG. 17 illustrates a flexspline geometry that has an elliptical radius of curvature in accordance with embodiments.

Embodiments Implementing BMG-Based Material Flexsplines With An Elliptical Radius Of Curvature Many other embodiments describe another design of the flexspline cup base that does not maintain the standard input base sizes and shapes. FIG. 17 illustrates a BMG-based material flexspline, according to embodiments, having a hemispherical base with a protruding flat input base. In such embodiments, the flexspline has a wall 1705 with a diameter, an input base 1702 with a diameter, and a hemispherical base 1704. The flexspline has a flat input base 1702 to connect to the input shaft. The radius of curvature of the rounded edge depends on the diameter of the flexspline and the diameter of the input shaft. Many embodiments describe the radius of curvature is at least 10% of the diameter of the flexspline. Many other embodiments include the flexspline has an elliptical radius of curvature. In some embodiments, the rounded base of the flexspline has axial symmetry around the rotational axis of the flexspline. In many such embodiments, the diameter at the teeth 1701 of the flexspline and the thickness of the wall near the teeth do not change from the standard flexspline such that the flexspline fits into a standard outer spline and wave generator. In many embodiments, the BMG flexspline can be used with a standard outer spline and wave generator based on the required size. However, the fatigue life and the manufacturing will be greatly enhanced through the rounding of the base.

Embodiments Implementing BMG-Based Material Flexsplines With A Flush Input Base

Figure 18:
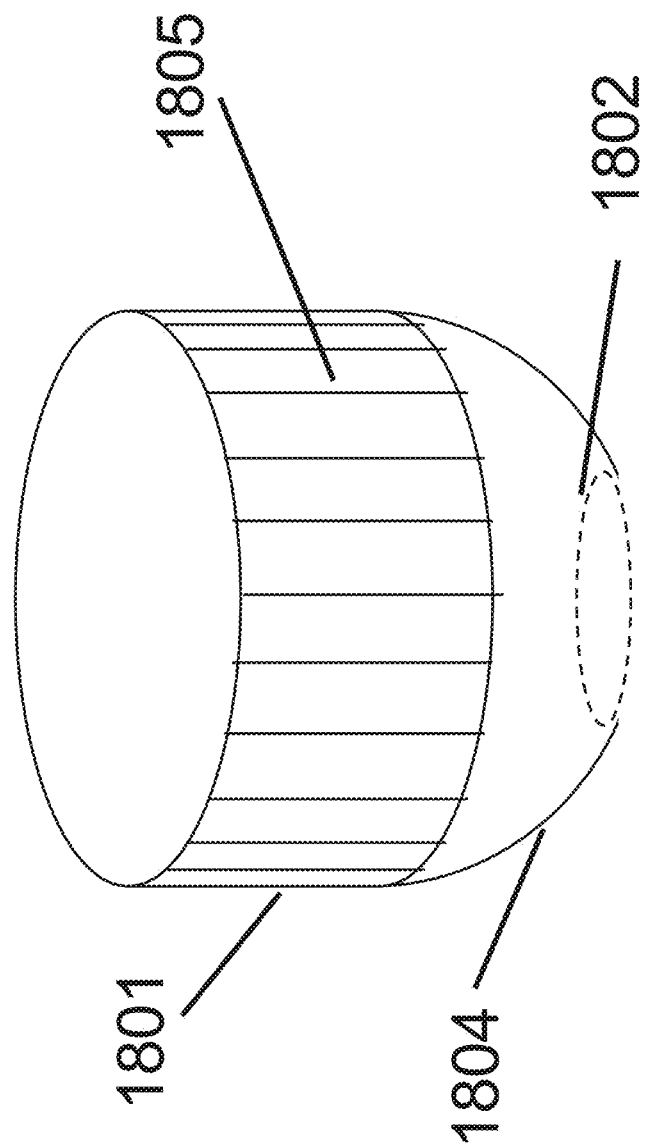
FIG. 18 illustrates a flexspline geometry that has an input base flush to the flexspline, eliminating another sharp stress concentration in accordance with embodiments.

Many other embodiments describe embodiments including a flush input base such that when the flexspline is cast from BMG, it has an improved fatigue life of at least 10% over a BMG with a steel design when run at the same torque. FIG. 18 illustrates embodiments of a BMG-based material flexspline with a flush input base. The flexspline has a wall 1805 with a diameter, an input base 1802 with a diameter, and a hemispherical base 1804. The input shaft or base 1802 of the flexspline cup where connections are made is flush with the flexspline, to eliminate sharp stress concentration. The flush input base 1802 connects to the input shaft. The radius of curvature depends on the diameter of the flexspline and the diameter of the input shaft. Many embodiments describe the radius of curvature is at least 10% of the diameter of the flexspline. In some embodiments, the hemispherical base of the flexspline has axial symmetry around the rotational axis of the flexspline. In many such embodiments the diameter at the teeth 1801 of the flexspline and the thickness of the wall near the teeth do not change from the standard flexspline such that the flexspline will fit into a standard outer spline and wave generator. In many embodiments, the BMG flexspline can be used with a standard outer spline and wave generator based on the required size. However, the fatigue life and the manufacturing will be greatly enhanced through the rounding of the base.

Figure 19:
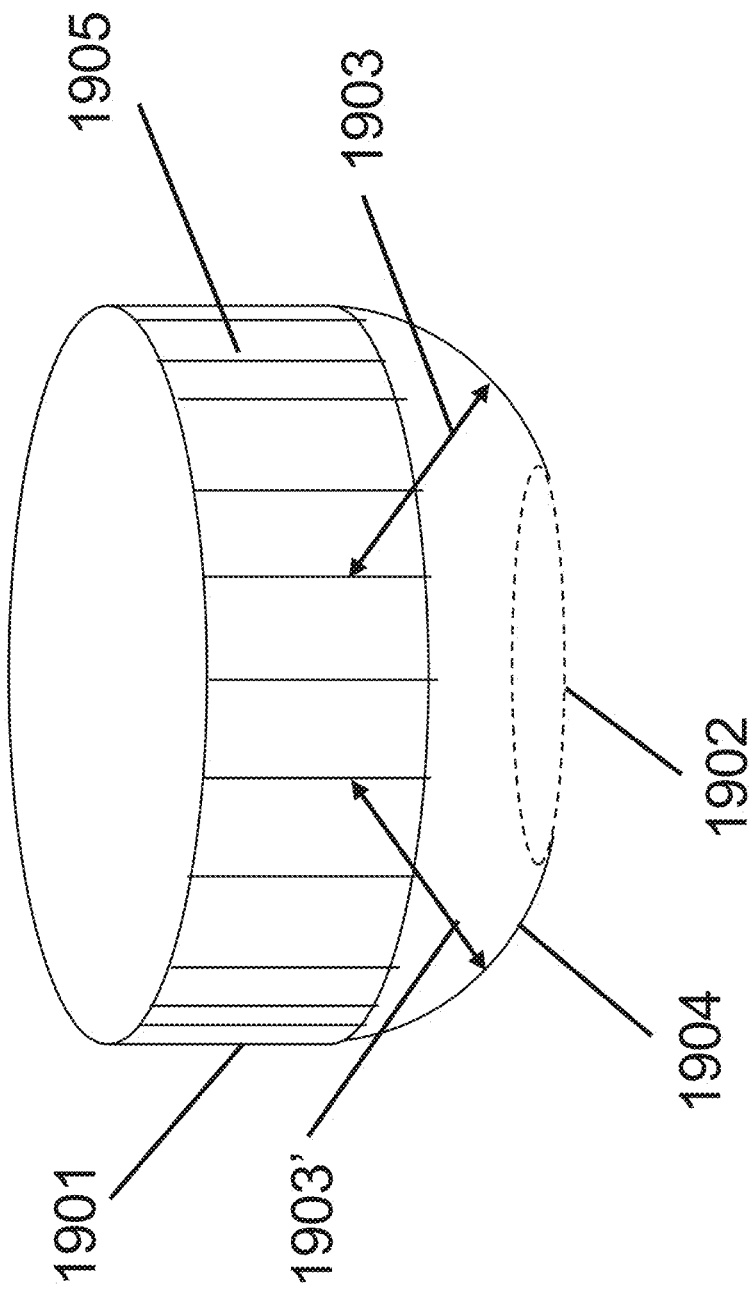
FIG. 19 illustrates a flexspline geometry that has two different spherical radii of curvature that make up the rounded corners of the flexspline in accordance with embodiments.

Embodiments Implementing BMG-Based Material Flexsplines With Two Different Spherical Radii Of Curvature In some other embodiments, the flexspline has two different spherical radii of curvature that make up the rounded corners of the flexspline. FIG. 19 illustrates the BMG-based material flexspline has a rounded base with a flush input base. The flexspline has a wall 1905 with a diameter, an input base 1902 with a diameter, and a rounded base 1904. The input base 1902 flushes to the flexspline and connects to the input shaft. The radius of curvature depends on the diameter of the flexspline and the diameter of the input shaft. Many embodiments describe two different spherical radii of curvature 1903 and 1903' that comprise the rounded corners of the flexspline. Many embodiments describe the radius of curvature is at least 10% of the diameter of the flexspline. In many such embodiments the diameter at the teeth 1901 of the flexspline and the thickness of the wall near the teeth do not change from the standard flexspline such that the flexspline will fit into a standard outer spline and wave generator. In many embodiments, the BMG flexspline can still be used with a standard outer spline and wave generator based on the required size. However, the fatigue life and the manufacturing will be greatly enhanced through the rounding of the base.

Doctrine of Equivalents

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A cup-type flexspline for a metal strain wave gear comprising,
   a base, and a vertical wall, wherein the vertical wall transitions through a curvature to the base, wherein an input shaft is disposed at the base;
   wherein the vertical wall is circular with an outer wall diameter, wherein the flexspline maintains circularity along the rotational axis of the vertical wall;
   wherein the maximum radius of curvature at the base of the cup is at least 10% of the diameter of the flexspline in accordance with the equation:

$$\text{Maximum radius of curvature} = \frac{(\text{Diameter of outer wall of flexspline}) - (\text{Diameter of input shaft})}{2}.$$

2. A cup-type flexspline for a metal strain wave gear of claim 1, wherein the radius of curvature is between about 15% to about 20% of the diameter of the flexspline.

3. A cup-type flexspline for a metal strain wave gear of claim 1, wherein the flexspline has a flush input base.

4. A cup-type flexspline for a metal strain wave gear of claim 1, wherein the flexspline has a hemispherical base curvature.

5. A cup-type flexspline for a metal strain wave gear of claim 1, wherein the flexspline has an elliptical base curvature.

6. A cup-type flexspline for a metal strain wave gear of claim 1, wherein the flexspline comprises a bulk metallic glass-based material.

7. A cup-type flexspline for a metal strain wave gear of claim 6, wherein the bulk metallic glass-based material is a bulk metallic glass.

8. A cup-type flexspline for a metal strain wave gear of claim 6, wherein the bulk metallic glass-based material is a bulk metallic glass matrix composite.

9. A cup-type flexspline for a metal strain wave gear of claim 6, wherein the flexspline has a fatigue life of at least 10% longer than a flexspline with the radius of curvature between about 1% to about 2% when run at the same torque.

10. A cup-type flexspline for a metal strain wave gear of claim 6, wherein the flexspline is formed using a net shape process.

11. A cup-type flexspline for a metal strain wave gear of claim 6, wherein the flexspline forming technique is one of: an injection molding technique; a die casting technique; a 3D printing technique; a thermoplastic forming technique; a blow molding technique; a discharge forming technique; a metal injection molding technique; a pressing with powder technique; a suction casting technique; and a forming from sheet metal technique.

12. A cup-type flexspline for a metal strain wave gear of claim 1, wherein the flexspline comprises a brittle material, wherein the brittle material has a fracture toughness less than about 50 MPa m$^{1/2}$.

13. A cup-type flexspline for a metal strain wave gear of claim 1, wherein the flexspline comprises a metal alloy, wherein the metal alloy has less than about 10% ductility in a tension test.

14. A cup-type flexspline for a metal strain wave gear of claim 1, wherein the flexspline comprises at least one of tool steel, nanocrystalline metals, nanograined metals, ceramics, and metal matrix composites.

15. A cup-type flexspline for a metal strain wave gear of claim 1, wherein the flexspline comprises a laminate of at least two materials.

16. A cup-type flexspline for a metal strain wave gear of claim 15, wherein the laminate material comprises at least one of metal, and carbon fiber with a metal coating.

* * * * *